US 8,334,800 B2

(12) United States Patent
Hayase

(10) Patent No.: US 8,334,800 B2
(45) Date of Patent: Dec. 18, 2012

(54) ON-VEHICLE RADAR DEVICE

(75) Inventor: Kei Hayase, Chiyoda-ku (JP)

(73) Assignee: Mitsubishi Electric Corporation, Tokyo (JP)

(*) Notice: Subject to any disclaimer, the term of this patent is extended or adjusted under 35 U.S.C. 154(b) by 314 days.

(21) Appl. No.: 12/900,184

(22) Filed: Oct. 7, 2010

(65) Prior Publication Data

US 2011/0234448 A1 Sep. 29, 2011

(30) Foreign Application Priority Data

Mar. 29, 2010 (JP) ................................. 2010-075208

(51) Int. Cl.
*G01S 13/42* (2006.01)
(52) U.S. Cl. ............... 342/70; 342/82; 342/84; 342/88; 342/94; 342/109; 342/128; 342/137
(58) Field of Classification Search .............. 342/70–72, 342/82, 84, 88, 94, 109–111, 128, 134–137
See application file for complete search history.

(56) References Cited

U.S. PATENT DOCUMENTS

| | | | | |
|---|---|---|---|---|
| 7,148,840 B2 * | 12/2006 | Dooi et al. | ...................... | 342/131 |
| 7,474,255 B2 * | 1/2009 | Hsieh et al. | ...................... | 342/95 |
| 7,843,381 B2 * | 11/2010 | Matsuoka | ....................... | 342/132 |
| 2002/0190894 A1 * | 12/2002 | Mitsumoto et al. | ............. | 342/70 |
| 2003/0210172 A1 * | 11/2003 | Pleva et al. | ......................... | 342/70 |
| 2004/0252047 A1 * | 12/2004 | Miyake et al. | ................. | 342/107 |
| 2004/0257266 A1 * | 12/2004 | Pleva et al. | ......................... | 342/70 |
| 2006/0012511 A1 * | 1/2006 | Dooi et al. | ......................... | 342/70 |
| 2006/0103571 A1 * | 5/2006 | Isaji | ................................. | 342/70 |
| 2006/0262007 A1 * | 11/2006 | Bonthron et al. | ............... | 342/70 |
| 2008/0272956 A1 * | 11/2008 | Pedersen et al. | ............. | 342/107 |
| 2009/0046000 A1 * | 2/2009 | Matsuoka | ....................... | 342/147 |
| 2009/0207068 A1 * | 8/2009 | Inaba | .............................. | 342/70 |
| 2009/0289831 A1 * | 11/2009 | Akita et al. | ....................... | 342/70 |
| 2009/0322591 A1 * | 12/2009 | Matsuoka | ....................... | 342/70 |
| 2010/0134343 A1 * | 6/2010 | Nakagawa | ..................... | 342/147 |
| 2011/0234448 A1 * | 9/2011 | Hayase | ........................... | 342/70 |
| 2012/0235859 A1 * | 9/2012 | Hayase | ......................... | 342/189 |

FOREIGN PATENT DOCUMENTS

| | | |
|---|---|---|
| JP | 2002-071792 A | 3/2002 |
| JP | 2006-90800 A | 4/2006 |
| JP | 2006-234474 A | 9/2006 |
| JP | 2009-31165 A | 2/2009 |
| JP | 2009-150707 A | 7/2009 |
| JP | 2009-276213 A | 11/2009 |

* cited by examiner

*Primary Examiner* — John B Sotomayor
(74) *Attorney, Agent, or Firm* — Sughrue Mion, PLLC

(57) ABSTRACT

A radar device includes: a frequency modulating unit for modulating a frequency of a transmission signal by a triangular wave; a transmitting unit for pulsing the frequency modulated transmission signal to transmit the pulsed transmission signal as a transmission pulse; a receiving unit for generating a beat signal based on a frequency difference between a frequency modulated transmission signal and a reflected received pulse; a range gate setting unit for setting a range gate that determines a sampling timing of the received pulse based on a transmitting timing of the transmission pulse; a sampling unit for sampling the beat signal in each of range gates; a distance and relative velocity calculating unit for calculating a distance to a target and a relative velocity based on the sampled beat signal; and a control unit for controlling a transmission pulse width and a range gate width depending on a subject vehicle velocity.

23 Claims, 30 Drawing Sheets

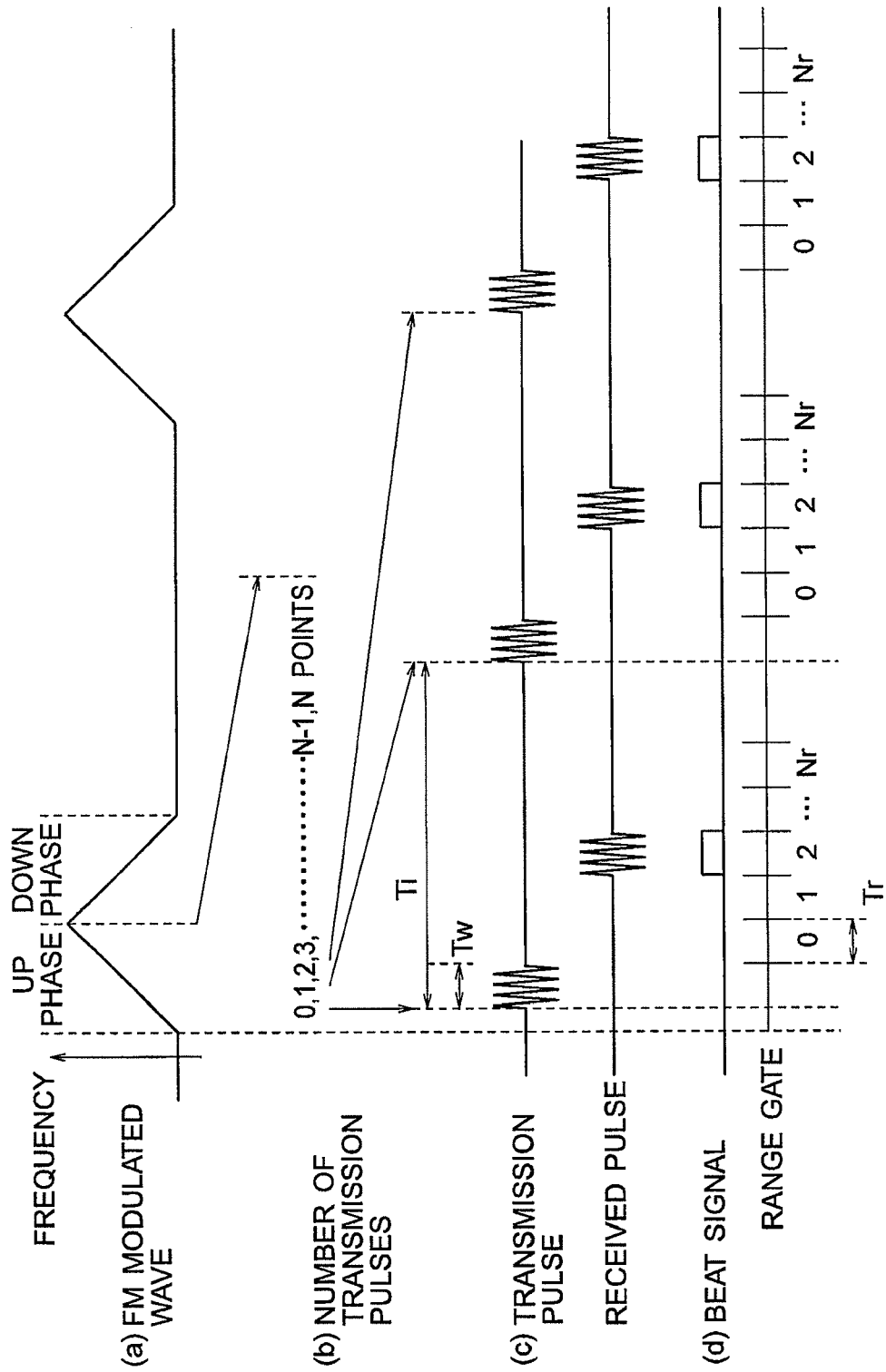

BEAT FREQUENCY
PROCESSING RANGE: RANGE 1

FIG. 7C

DETECTION RESULTS

| COMBINATION | DETECTION RESULTS | | DETERMINATION |
| --- | --- | --- | --- |
| | VELOCITY | DISTANCE | |
| U1:D1 | V1 | R1 | → WITHIN RANGE 1 |
| U1:D2 | V3 | R3 | → WITHIN RANGE 1 |
| U2:D1 | V4 | R4 | → OUT OF RANGE 1 |
| U2:D2 | V2 | R2 | → WITHIN RANGE 1 |

ON-VEHICLE RADAR DEVICE

BACKGROUND OF THE INVENTION

1. Field of the Invention

The present invention relates to a radar device that obtains a distance to a target and a relative velocity, in which a pulse width and a range gate interval (width) are changed depending on a travel environment so as to ensure both of a short-distance precision and a long-distance performance without increasing a calculation amount.

2. Description of the Related Art

Currently known radar devices that are mounted on a vehicle and used for an adaptive cruise control (ACC) or a collision mitigation braking device include a radar device of a frequency modulated continuous wave (FMCW) system (hereinafter, referred to as "FMCW radar device") which may detect the distance to the target and the relative velocity at the same time. The "FMCW system" is one of radar transmitting systems, and calculates a difference in frequency between a transmission wave and a received wave (a reflected wave resulting from reflecting the transmission wave by the target) so as to calculate the distance to an object (target) and the velocity.

In the FMCW radar device, a transmission signal of a continuous wave (CW) is subjected to FM modulation. The frequency of an oscillator is modulated by a triangular wave, and radiated to the outside from a transmit antenna. A signal obtained by reflecting a transmission signal by the target and receiving the transmission signal by a receive antenna undergoes a time delay caused by the distance, and a frequency shift corresponding to the relative velocity. The receive signal that has undergone the frequency shift is mixed with the transmission signal by a mixer to obtain a beat signal. When a beat frequency in a frequency up zone and a beat frequency in a frequency down zone are measured in each modulation cycle, separately, the distance to the target and the relative velocity may be obtained. The above-mentioned technology is generally known in the field of FMCW radar devices.

In the above-mentioned FMCW radar device, when a plurality of targets exist, the beat signal is generated for each of the plurality of targets, making it difficult to know a correspondence relation between each beat signal and each target. Under the circumstances, there has been proposed a radar device in which a frequency modulated signal as the transmission signal is pulsed as a transmission pulse signal, and a received pulse signal is sampled based on a transmission timing of the transmission pulse signal every given period of time to facilitate the correspondence of the plurality of beat signals (see, for example, Japanese Patent Application Laid-Open No. 2009-150707).

In the radar device disclosed in Japanese Patent Application Laid-Open No. 2009-150707, range gates for conducting sampling timing every given period of time from the transmission timing are provided to detect the target in each of the range gates. In this case, the distance range in which the beat signal is caused by the reflected wave from a target may be narrowed down to some extent based on how much time elapses from the transmission timing for each range gate, false detection is reduced. Further, when a period of time required for sampling from the start of measurement data till the end thereof is regarded as a measurement time, the measurement time is changed for each of the range gates so that an optimum distance resolution and an optimum relative velocity resolution may be set depending on the distance to the target, to thereby realize a bifocal radar.

In the configuration of the radar device disclosed in Japanese Patent Application Laid-Open No. 2009-150707, in order to improve a detection precision in short distance, a range gate width needs to be reduced (that is, a sampling timing interval needs to be reduced). This is because the range gate width is reduced to narrow the target distance range of each range gate, as a result of which the distance range in which the beat signal is caused by the reflected wave from a target may be easily narrowed down, and a desired signal may be easily specified from the plurality of beat signals. Further, because the received wave intensity is inversely proportional to the fourth power of the distance, when the range gate width is reduced, a dynamic range required for signal processing particularly in short distance is reduced. As a result, the number of bits required in the signal processing is reduced to downsize a computing unit. Alternatively, because integration or amplification is more easily executed in the signal processing, an S/N ratio in the signal processing is increased, and a target detection precision is improved.

When a target at a long distance is intended to be detected while keeping the short-distance detection precision, the number of range gates needs to be increased. However, an increase in the number of range gates generally leads to an increase in the calculation amount and memories. As the calculation amount increases, the number of required computing units increases, which prevents the radar from being downsized and reduced in price. Unless the number of computing units is increased, a calculation time is increased, and a response of the radar is deteriorated. An increase in the frequency of calculation leads to an increase in power consumption of the radar, and an increase in calorific value. An increase in the memories also prevents the radar from being downsized and reduced in price.

On the other hand, when the target at the long distance is intended to be detected without changing the number of range gates, the range gate width needs to be widened. However, this leads to the deterioration in the short-distance detection precision. The above-mentioned facts make it difficult to reduce the bifocal radar in size and price.

SUMMARY OF THE INVENTION

The present invention has been made to solve the above-mentioned problems, and an object of the present invention is to provide an on-vehicle radar device that may improve a detection precision of short distance and also may detect a target at a long distance without increasing a calculation amount.

An on-vehicle radar device according to the present invention includes: frequency modulating means for modulating a frequency of a transmission signal by a triangular wave; transmitting means for pulsing the frequency modulated transmission signal to transmit the pulsed transmission signal as a transmission pulse to a target; receiving means for receiving a signal reflected by the target as a received pulse to generate a beat signal based on a frequency difference between a part of the frequency modulated transmission signal and the received pulse; range gate setting means for setting a range gate that determines a sampling timing of the received pulse based on a transmitting timing of the transmission pulse; sampling means for sampling the beat signal in each of set range gates; distance and relative velocity calculating means for calculating a distance to the target and a relative velocity of the target based on the sampled beat signal; and control means for controlling the frequency modulating means, the transmitting means, and the range gate setting means to change a transmission pulse width and a range gate width depending on a subject vehicle velocity acquired from vehicle velocity detecting means at a timing of the frequency modulation.

According to the on-vehicle radar device of the present invention, there is provided means for changing the transmission pulse width and the range gate width that determines the sampling timing according to the timing of frequency modulation, and the transmission pulse width and the range gate width are changed according to the subject vehicle velocity, resulting in such an advantage that the target at the long distance may be also detected without increasing a calculation amount while a detection precision in short distance is improved.

BRIEF DESCRIPTION OF THE DRAWINGS

In the accompanying drawings:

FIG. 4 is a chart for illustrating each timing of the operation of the on-vehicle radar device according to the first embodiment of the present invention;

FIG. 7C is a conceptual diagram for illustrating the case where the on-vehicle radar device according to the first embodiment of the present invention detects two targets;

DETAILED DESCRIPTION OF THE PREFERRED EMBODIMENTS

Hereinafter, an on-vehicle radar device according to preferred embodiments of the present invention is described with reference to the accompanying drawings.

First Embodiment

Figure 1:
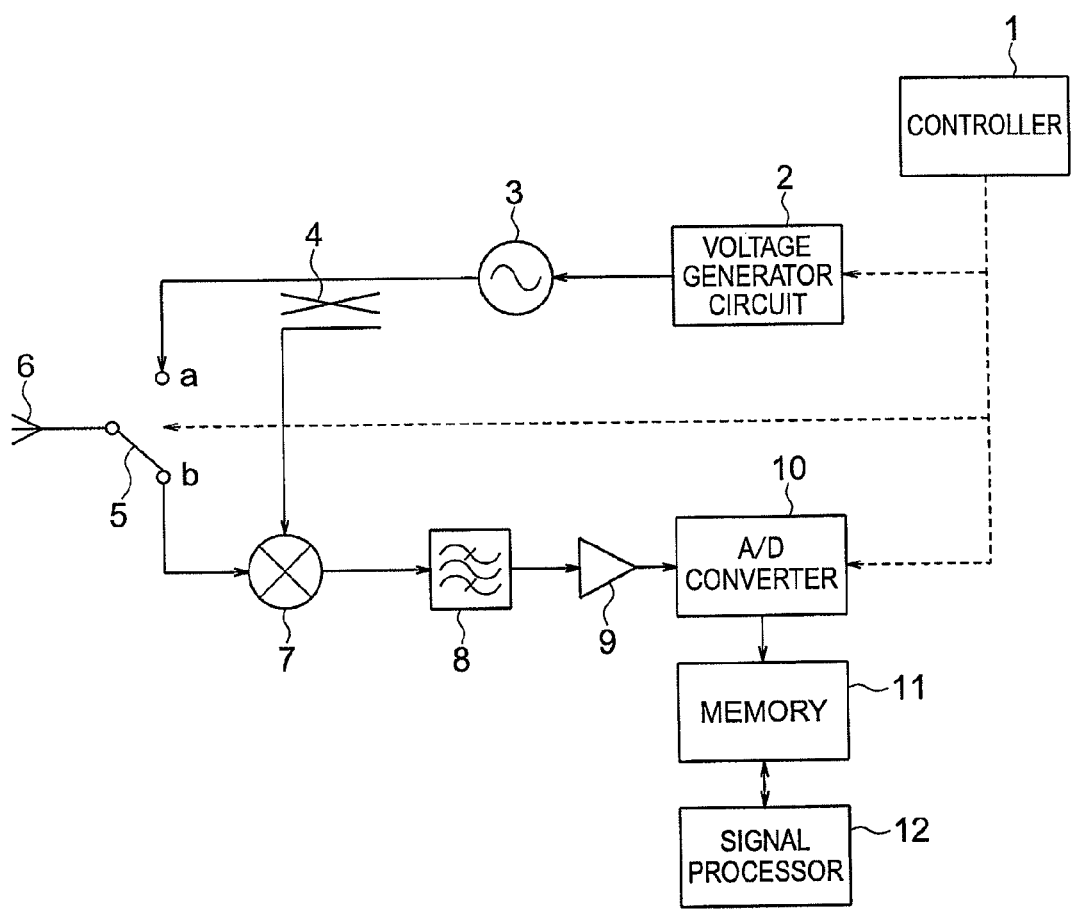
FIG. 1 is a diagram illustrating a configuration of an on-vehicle radar device according to a first embodiment of the present invention.

An on-vehicle radar device according to a first embodiment of the present invention is described with reference to FIGS. 1 to 9B. FIG. 1 is a diagram illustrating the configuration of the on-vehicle radar device according to the first embodiment of the present invention. In the following description, the same reference symbols denote identical or corresponding parts.

Referring to FIG. 1, the on-vehicle radar device according to the first embodiment of the present invention includes: a controller 1 that controls a voltage generator circuit 1 and the like to be described later; a voltage generator circuit 2 that generates a triangular wave voltage; a voltage controlled oscillator (VCO) 3 that conducts frequency modulation; a distributer 4 that distributes a transmit electric wave; and a switch 5 that changes over between terminals a and b. The on-vehicle radar device also includes: a transmitting and receiving antenna 6; a mixer 7; a bandpass filter 8; an amplifier 9; an analog to digital (A/D) converter 10 that samples a received pulse signal; a memory 11 that stores the sampled received pulse signal therein; and a signal processor 12 that calculates a distance to a target and a relative velocity.

The controller 1 controls the voltage generator circuit 2 and the switch 5 to conduct frequency modulation based on a triangular wave and generate timing for transmission and reception pulses. At the same time, the controller 1 controls the A/D converter 10 and generates timing at which the received pulse signal is sampled in each range gate. Further, the signal processor 12 is configured by a central processing unit (CPU), or a CPU and a digital signal processor (DSP), a field programmable gate array (FPGA), an application specific integrated circuit (ASIC), or the like.

Figure 2:
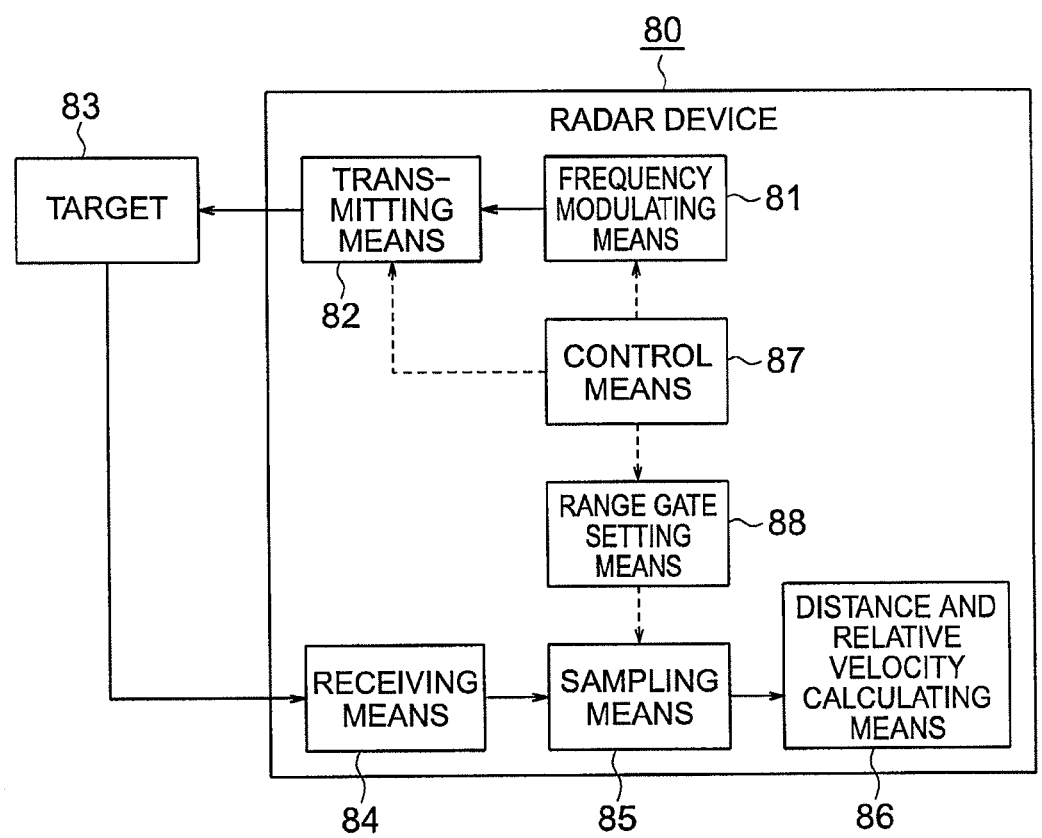
FIG. 2 is a block diagram illustrating a conceptual configuration of an on-vehicle radar device according to the present invention.

FIG. 2 is a block diagram illustrating a conceptual configuration of an on-vehicle radar device according to the present invention.

A radar device 80 of an FM pulse system according to the present invention includes: frequency modulating means 81 that modulates a frequency of a transmission signal by the aid of a triangular wave; transmitting means 82 that pulses the frequency modulated transmission signal, and transmits the pulsed signal to a target 83 as a transmission pulse; receiving means 84 that receives a signal reflected by the target 83 as a receive signal to generate a beat signal due to a frequency difference between a part of the frequency modulated transmission signal and the received pulse; and range gate setting means 88 that sets a range gate for determining the sampling timing of the received pulse based on the transmit timing of the transmission pulse. The radar device 80 also includes: sampling means 85 that samples the beat signal in each of the set range gates; distance/relative velocity calculating means 86 that calculates a distance to the target 83 and a relative velocity of the target 83 based on the sampled beat signal; and control means 87 that controls the frequency modulating means 81, the transmitting means 82, and the range gate setting means 88, and changes a transmission pulse width and a range gate width according to a subject vehicle velocity acquired from a vehicle velocity detecting means.

A correspondence relationship between the respective components illustrated in FIG. 1 and the respective components illustrated in FIG. 2 is described. The voltage generator circuit 2 and the voltage controlled oscillator 3 constitute the frequency modulating means 81. The switch 5 and the transmitting and receiving antenna 6 constitute the transmitting means 82. The transmitting and receiving antenna 6, the switch 5, the distributer 4, the mixer 7, the bandpass filter 8, and the amplifier 9 constitute receiving means 84. Further, the A/D converter 10 corresponds to the sampling means 85. The memory 11 and the signal processor 12 constitute the distance/relative velocity calculating means 86. Further, the controller 1 constitutes the control means 87 and the range gate setting means 88.

Subsequently, the operation of the on-vehicle radar device according to the first embodiment is described with reference to the drawings.

FIGS. 3A to 3E are timing charts illustrating an operation of the on-vehicle radar device according to the first embodiment of the present invention.

Figure 3A:
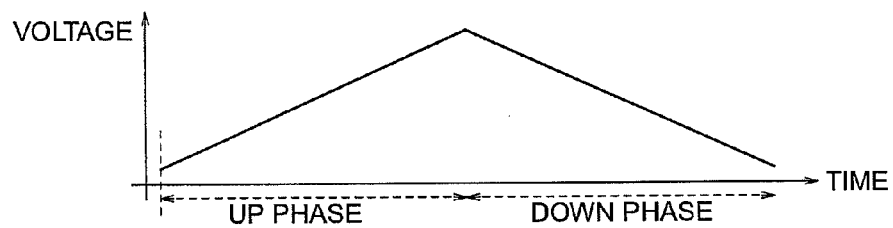
FIG. 3A is a timing chart illustrating an operation of the on-vehicle radar device according to the first embodiment of the present invention.

First, the voltage generator circuit 2 whose timing is controlled by the controller 1 generates "a voltage that temporally changes into a triangular wave" illustrated in FIG. 3A, and applies the voltage to the voltage controlled oscillator (VCO) 3. The voltage controlled oscillator 3 generates a frequency modulated continuous wave (FMCW) whose frequency temporally changes according to the applied voltage, and outputs the generated continuous wave to the distributer 4.

Figure 3B:
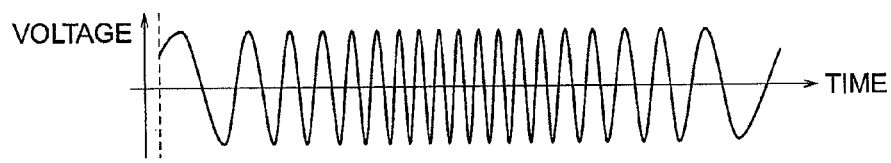
FIG. 3B is a timing chart illustrating the operation of the on-vehicle radar device according to the first embodiment of the present invention.

FIG. 3B illustrates "the frequency modulated continuous wave whose frequency temporally changes" which is output to the distributer 4.

The distributor 4 outputs a part of the input FMCW to the terminal "a" of the switch 5 as a transmission signal, and outputs the rest to the mixer 7 as a local signal.

The switch 5 changes over to the terminal "a" so as to be rendered conductive to the transmitting and receiving antenna 6 for a given period of time, and the transmitting and receiving antenna 6 radiates a pulsed transmission signal to a space. The given timing and the given period of time are determined according to a control signal from the controller 1.

The switch 5 changes over to the terminal b, which is on a receiver side, after the given period of time has elapsed. The reflected wave from the target is received by the transmitting and receiving antenna 6, and is generated as a receive signal (indicated by the broken line) of FIG. 3C (FIG. 3 does not illustrate how the signal is pulsed). After that, the receive signal is output to the mixer 7 through the switch 5.

Figure 3C:
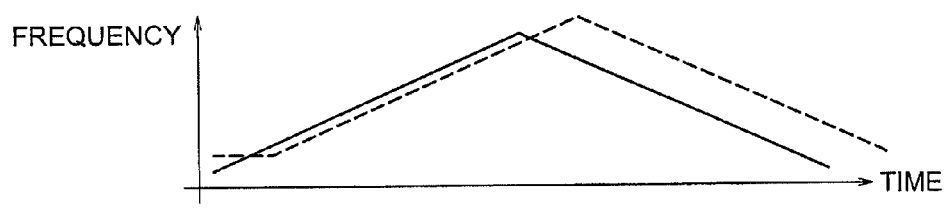
FIG. 3C is a timing chart illustrating the operation of the on-vehicle radar device according to the first embodiment of the present invention.
Figure 3D:
FIG. 3D is a timing chart illustrating the operation of the on-vehicle radar device according to the first embodiment of the present invention.
Figure 3E:
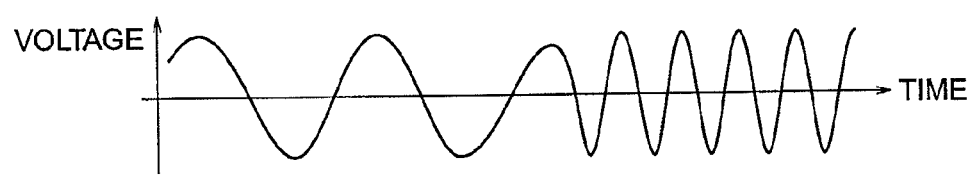
FIG. 3E is a timing chart illustrating the operation of the on-vehicle radar device according to the first embodiment of the present invention.

The mixer 7 receives the receive signal and a local signal (indicated by the solid line) of FIG. 3C which is output by the distributer 4, and mixes those signals together to generate a beat signal. A frequency change of the beat signal with respect to time is illustrated in FIG. 3D, and a voltage change of the beat signal with respect to time is illustrated in FIG. 3E.

After the beat signal generated by the mixer 7 has an unnecessary frequency component removed by the bandpass filter 8, the beat signal is amplified by the amplifier 9, and output to the A/D converter 10.

The A/D converter 10 receives the beat signal in synchronism with a measurement time of an up phase or a down phase of FIG. 3A, and outputs the beat signal, as a digital voltage value, to the memory 11. At this time, the sample timing is controlled by the controller 1.

The signal processor 12 receives the digital voltage value of the beat signal in the up phase or the digital voltage value of the beat signal in the down phase when the measurement time of the up phase or the down phase in FIG. 3A is up, calculates the distance to the target, the relative velocity, and the angle, and outputs a calculation result to another device.

FIG. 4 is a chart for illustrating each timing of the operation of the on-vehicle radar device according to the first embodiment of the present invention. The timing of the respective signals is described in detail with reference to FIGS. 4A to 4D.

In FIG. 4, an item (a) illustrates an FM modulated continuous wave (FMCW) output from the above-mentioned VCO 3. In FIGS. 4A to 4D, attention is paid to the up phase in the FMCW for description.

As illustrated by an item (b) of FIG. 4, a given number (N in the drawing) of transmission pulses are transmitted during the up phase.

As illustrated by an item (c) of FIG. 4, the transmission pulses are transmitted with a pulse width Tw and in a pulse period Ti, and reflected waves (received pulses) from an object (that is, a target) are received with respect to the respective transmission pulses.

On the receiver side, as illustrated by an item (d) of FIG. 4, range gates (0 to Nr) are set, and the beat signal is sampled in each of the range gates. Each range gate is configured to determine timing at which the reflected received pulse is sampled after the transmission pulse is transmitted. In the drawing, it is assumed that a width of the range gates (that is, sampling interval) is Tr.

The transmission pulse width Tw and the range gate width Tr are set by the controller 1 according to the subject vehicle velocity acquired from the vehicle velocity detecting means, and the pulses are transmitted by changing over the switch 5 at the set timing, and the receive signal is subjected to A/D conversion by the A/D converter 10.

When the target travels, the beat frequency may be represented by the following Expressions (1) and (2).

$$U=fr-fd \quad (1)$$

$$D=fr+fd \quad (2)$$

In Expressions (1) and (2), U is a beat frequency in a frequency up zone (up phase), D is a beat frequency in a frequency down zone (down phase), fr is a Doppler frequency when the relative velocity is 0, and fd is a Doppler frequency based on the relative velocity.

Accordingly, when the beat frequencies U and D are separately measured in each cycle of modulation, the Doppler frequencies fr, fd, the distance R to the target, and the relative velocity V may be obtained as represented by Expressions (3) and (4).

$$fr=(U+D)/2(\infty R) \quad (3)$$

$$fd=(D-U)/2(\infty V) \quad (4)$$

The distance R to the target and the relative velocity V may be represented by the following Expressions (5) and (6), which are a detailed description of Expressions (3) and (4).

$$R=(cTm/2\Delta F) \times fr \quad (5)$$

$$V=(c/2fc) \times fd \quad (6)$$

In Expressions (5) and (6), c is a light speed, Tm is a measurement time in each phase, $\Delta F$ is a modulated width, and fc is a carrier frequency.

Figure 5:
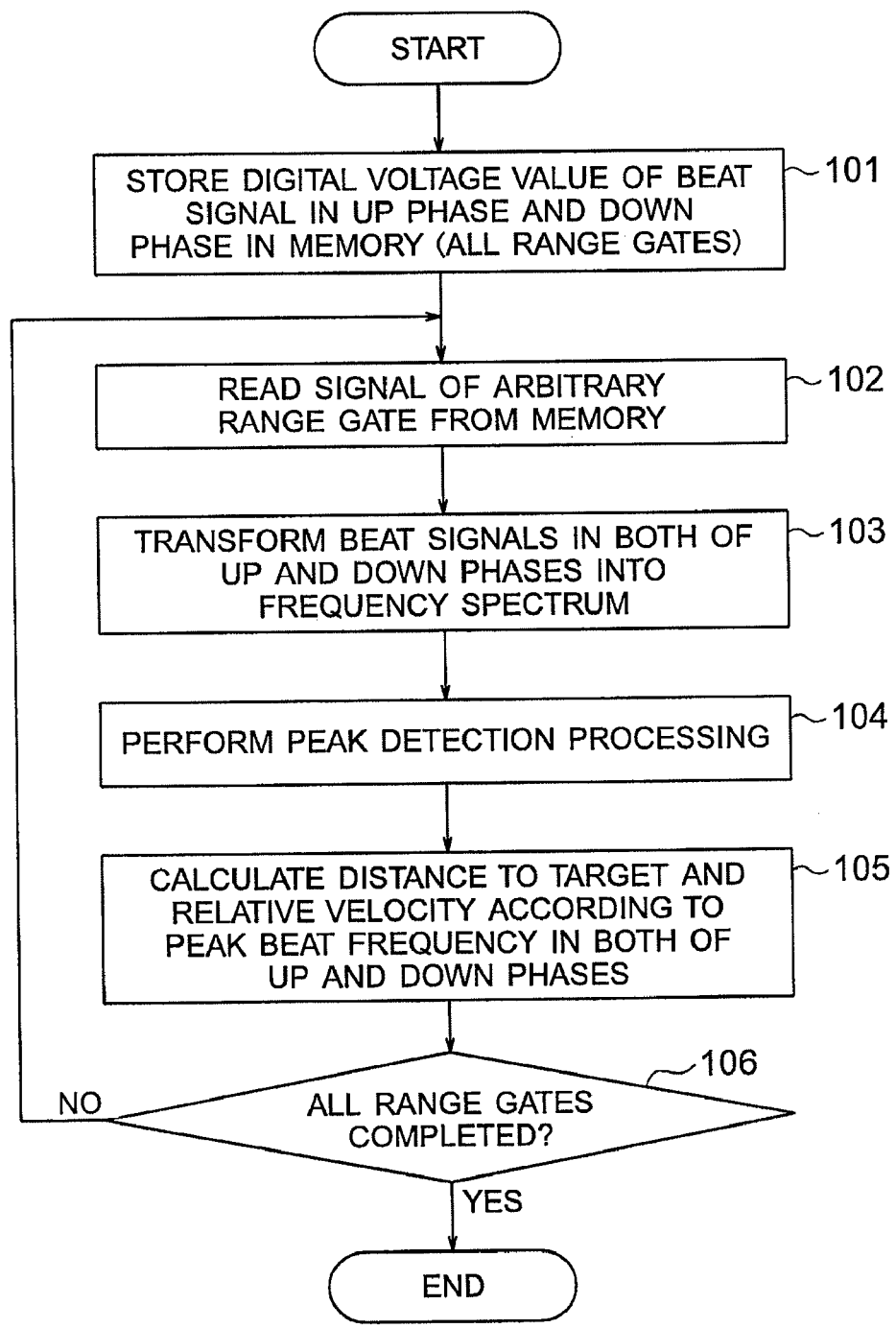
FIG. 5 is a flowchart illustrating an operation of a signal processor in the on-vehicle radar device according to the first embodiment of the present invention.

FIG. 5 is a flowchart illustrating an operation of a signal processor in the on-vehicle radar device according to the first embodiment of the present invention.

The operation of the signal processor 12 is described below with reference to the flowchart of FIG. 5. In the following, the respective steps of the operation are described.

First, in Step 101, the beat signals in the up phase and the down phase are sampled in each range gate, and the digital voltage value is recorded in the memory 11.

Subsequently, in Step 102, a signal (digital voltage value) of an arbitrary range gate which has been recorded in Step 101 is read from the memory 11.

Then, in Step 103, the signal read from the memory 11 in Step 102 is subjected to, for example, fast Fourier transform (FFT) so as to be transformed into a frequency spectrum. Alternatively, discrete Fourier transform (DFT) may be used for frequency transform.

Then, in Step 104, peak detection processing is conducted on the frequency spectrum (that is, the beat frequency) obtained in Step 103.

Then, in Step 105, the distance to the target and the relative velocity are calculated according to a peak beat frequency of both of the up and down phases. Each range gate is set in a given distance range, and hence it is checked whether or not the calculated distance falls within the distance range of a subject range gate. If the calculated distance falls within the distance range, the target is formally registered as a target (object). If the calculated distance falls out of the distance range, the target is not registered.

Then, in Step 106, it is checked whether or not processing has been completed with respect to all of the range gates. If the processing has not been completed, the processing is returned to Step 102, and if the processing has been completed, the processing is terminated.

Then, a method of changing the transmission pulse width Tw and the range gate width Tr, based on the subject vehicle velocity is described in detail.

Figure 6A:
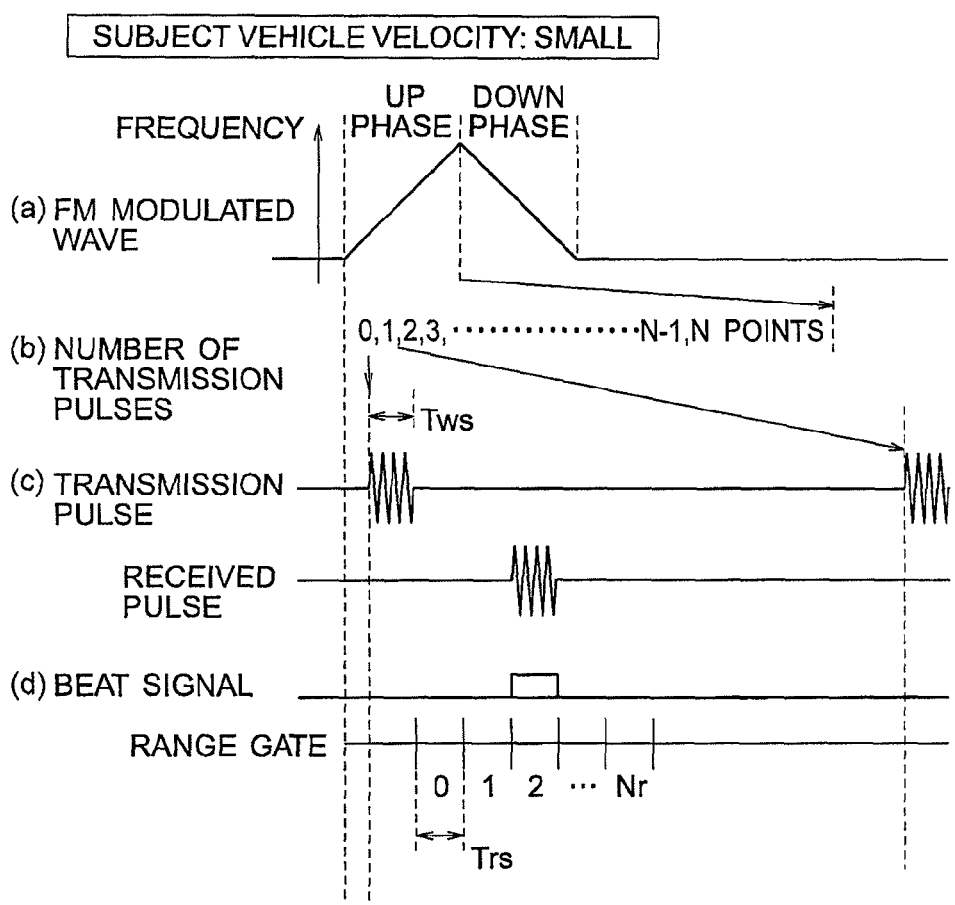
FIG. 6A is a chart for illustrating a change in transmission pulse width and range gate width of the on-vehicle radar device according to the first embodiment of the present invention.
Figure 6B:
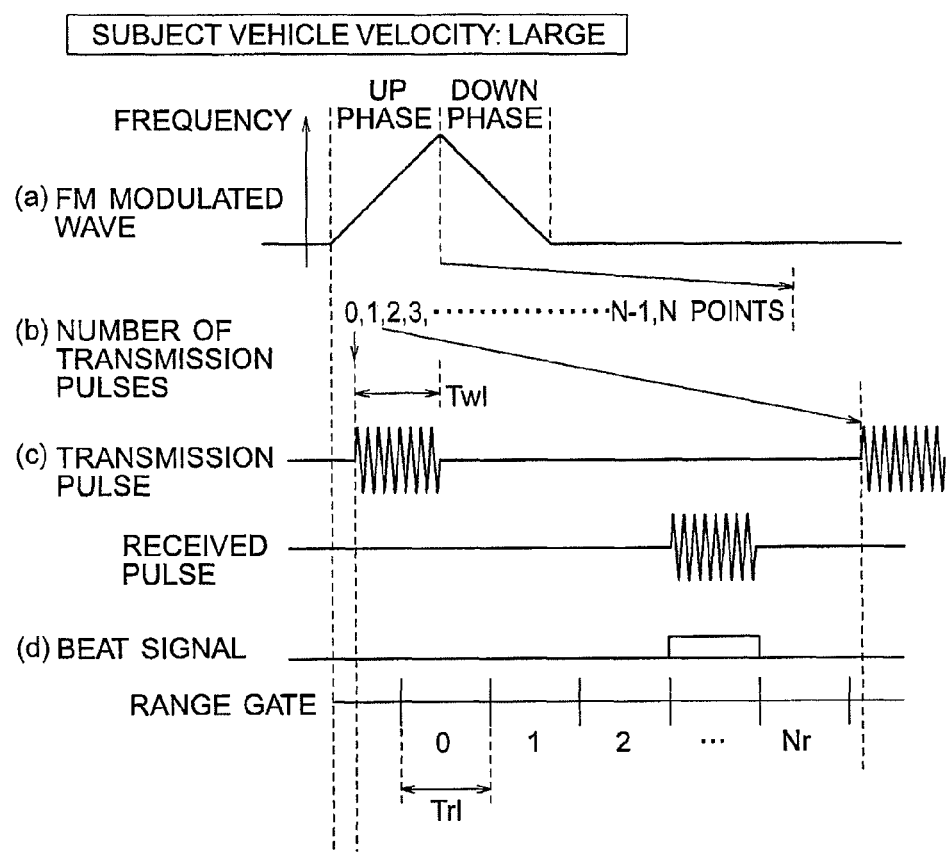
FIG. 6B is a chart for illustrating the change in transmission pulse width and range gate width of the on-vehicle radar device according to the first embodiment of the present invention.

FIGS. 6A and 6B are diagrams for illustrating a change in the transmission pulse width and the range gate width. The respective items (a) to (d) of FIGS. 6A and 6B are identical with those of FIG. 4. Further, Tws and Trs of FIGS. 6A and 6B indicate a transmission pulse width and a range gate width when the subject vehicle velocity is small, respectively, and Twl and Trl indicate a transmission pulse width and a range gate width when the subject vehicle velocity is large, respectively (Tws<Twl, Trs<Trl). When the subject vehicle velocity is small, the transmission pulse width and the range gate width are set to be smaller than a reference transmission pulse width and a reference range gate width. When the subject vehicle velocity is large, the transmission pulse width and the range gate width are set to be larger than the reference transmission pulse width and the reference range gate width. In the following description, a reason and an advantage for this setting are described. The reference transmission pulse width and the reference range gate width are a conventional transmission pulse width and a conventional range gate width, respectively.

First, consideration is given to the case in which the subject vehicle velocity is small. The case where the subject vehicle velocity is small usually corresponds to a case where the subject vehicle is traveling on an open road. Accordingly, there are a large number of targets such as vehicles and obstacles, which often cut in front of the subject vehicle or run in front of the subject vehicle in short distance, and hence it is required to detect the target with high precision. On the other hand, there is no need to detect an object at a long distance. Therefore, the range gate width is set to be small.

Figure 7A:
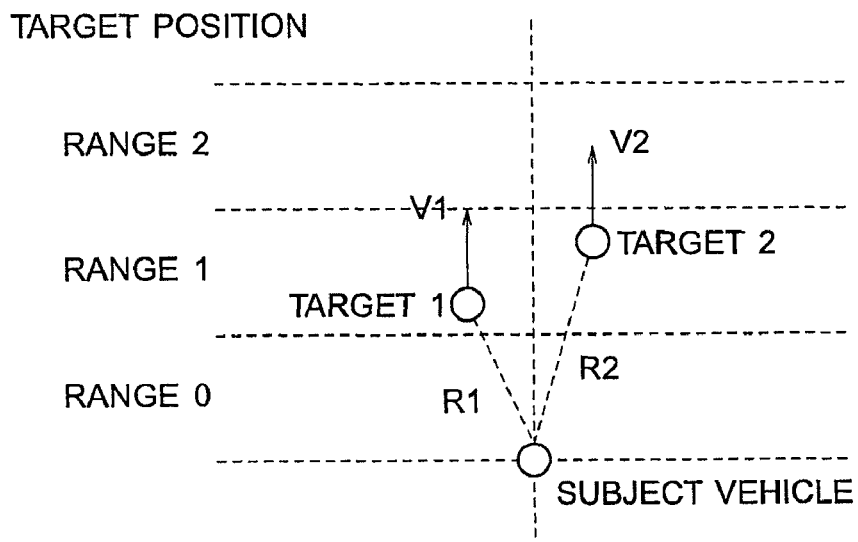
FIG. 7A is a conceptual diagram for illustrating a case where the on-vehicle radar device according to the first embodiment of the present invention detects two targets.
Figure 7B:
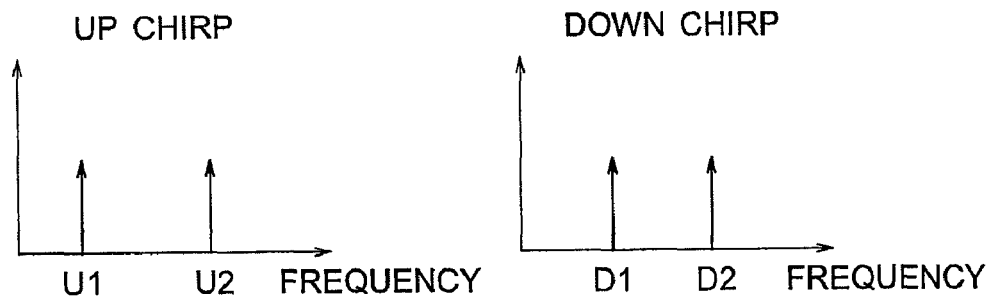
FIG. 7B is a conceptual diagram for illustrating the case where the on-vehicle radar device according to the first embodiment of the present invention detects two targets.

The target detection precision is enhanced when the range gate width is set to be small, which is described with reference to FIGS. 7A to 7C. FIGS. 7A to 7C are conceptual diagrams each for illustrating a case where the on-vehicle radar device according to the first embodiment of the present invention detects two targets.

As illustrated in FIG. 7A, a target 1 and a target 2 travel at relative velocities V1 and V2, respectively at distances R1 and R2 from the subject vehicle, respectively. The distance R1 and R2 fall within the distance range of the range gate 1.

Then, as illustrated in FIG. 7B, beat frequencies U1, D1 and beat frequencies U2, D2 are generated from the target 1 and the target 2, respectively. However, in fact, at a time point when the beat frequencies in an up chirp and a down chirp are obtained in Step 104 of FIG. 5, it is unknown which of the targets 1 and 2 have generated which of the beat frequencies U1 and U2. The same is applied to D1 and D2. Accordingly, as illustrated in FIG. 7C, the relative velocities and the distances are obtained from Expressions (3), (4), (5), and (6), based on all combinations of the beat frequencies.

Then, it is checked whether or not the distances of the detection results fall within the range gate 1. In this example, it is assumed that the distances R1, R2, and R3 of the detection results fall within the range gate 1. It is needless to say the distances R1 and R2 naturally fall within the range gate 1 because the distances R1 and R2 are obtained as the calculation results based on the correct combinations U1, D1 and U2, D2 of the beat frequencies from the target 1 and the target 2. On the other hand, the combination of U1 and D2 and the combination of U2 and D1 are virtual images of erroneous combinations, which do not originally exist. Therefore, registration of combinations as targets leads to misdetection. The target represented by the combination of U2 and D1 is R4 in distance, which falls out of the range gate 1, and hence the target may be removed from the registration as a target. However, the target represented by the combination of U1 and D2 is R3 in the distance R3, which accidentally fall within the range gate 1, and hence must be registered as a target.

When the range gate width is set to be small, it is less likely that the distance accidentally fall within the range gate 1 as with R3 represented by the combination of U1 and D2, which reduces misdetection. As a result, when the range gate width is set to be small, the target detection precision is enhanced.

Further, when the range gate width is set to be small, a dynamic range required for signal processing may be reduced. The reason is described below.

An electric power received by the radar device is represented by the following expression.

$$Pr = (PtGt^2\lambda^2\sigma)/((4\pi)^3 R^4) \quad (7)$$

In Expression (7), Pr is a received power, Pt is a transmitted power, Gt is a gain of the transmitting and receiving antenna 6, $\lambda$ is a wavelength, and $\sigma$ is a scattering cross section area.

Figure 8:
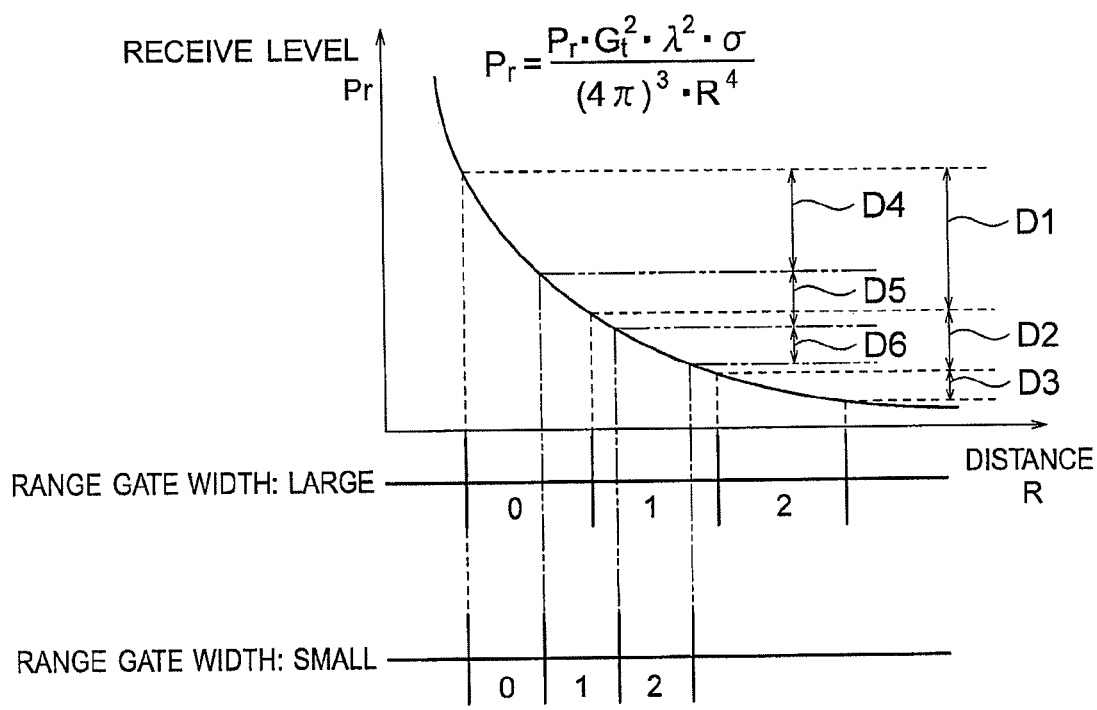
FIG. 8 is a graph illustrating a relationship between the range gate width and the receive dynamic range of the on-vehicle radar device according to the first embodiment of the present invention.

FIG. 8 is a graph illustrating a relationship between the range gate width and the receive dynamic range based on Expression (7). For simplification, the number of range gates is 3 in this example. In the graph, D1, D2, and D3 denote dynamic ranges (hereinafter, simply referred to as "dynamic range") required for signal processing of the range gates 0, 1, and 2 when the range gate widths are set to be large. Likewise, D4, D5, and D6 are dynamic ranges of the range gates 0, 1, and 2 when the range gate widths are set to be small.

It is found that in both of the cases where the range gate width is set to be large and small, the range gate 0 is widest in dynamic range. This is because, in Expression (7), the received power is inversely proportional to the fourth power of the distance. The same is applied to a case in which the number of range gates is equal to or larger than 3, and the range gate 0 is widest in the dynamic range. In the range gate 0 having the largest dynamic range in setting of each range gate width, the dynamic range D4 when the range gate width is set to be small is smaller than the dynamic range D1 when the range gate width is set to be large.

When the dynamic range becomes small, the number of bits required for signal processing is reduced, and the scale of a computing unit is reduced. Alternatively, amplification of the signal in signal processing is facilitated, and precision may be expected to be improved due to an improvement in the S/N ratio.

As described above, when the range gate width is reduced in short distance, the dynamic range required for signal processing is reduced with the result that a reduction in the circuit scale or an improvement in precision may be expected. Described above are advantages obtained by setting the range gate width to be small when the subject vehicle velocity is small.

Next, a case in which the subject vehicle velocity is large is described. The case where the subject vehicle velocity is large mainly corresponds to a case where the subject vehicle is traveling on a highway. Therefore, the number of targets such as vehicles and obstacles is generally small, which hardly cut in front of the subject vehicle or run in front of the subject vehicle in short distance. On the other hand, it is required to detect an object at a long distance. Therefore, the range gate width is set to be large. When the range gate width is set to be large, a target at a long distance may be detected. On the other hand, the number of range gates is not changed, and hence the calculation amount is not increased.

The transmission pulse width also changes together with a change in range gate width. The transmission pulse width is set to be larger than one reference range gate width Tr (1×Tr) and smaller than two reference range gate widths Tr (2×Tr). When the transmission pulse width is thus changed together with the range gate width, the reflected waves from the targets are reliably sampled, while the reflected waves from the same target may be prevented from being sampled in the plurality of range gates.

Figure 9A:
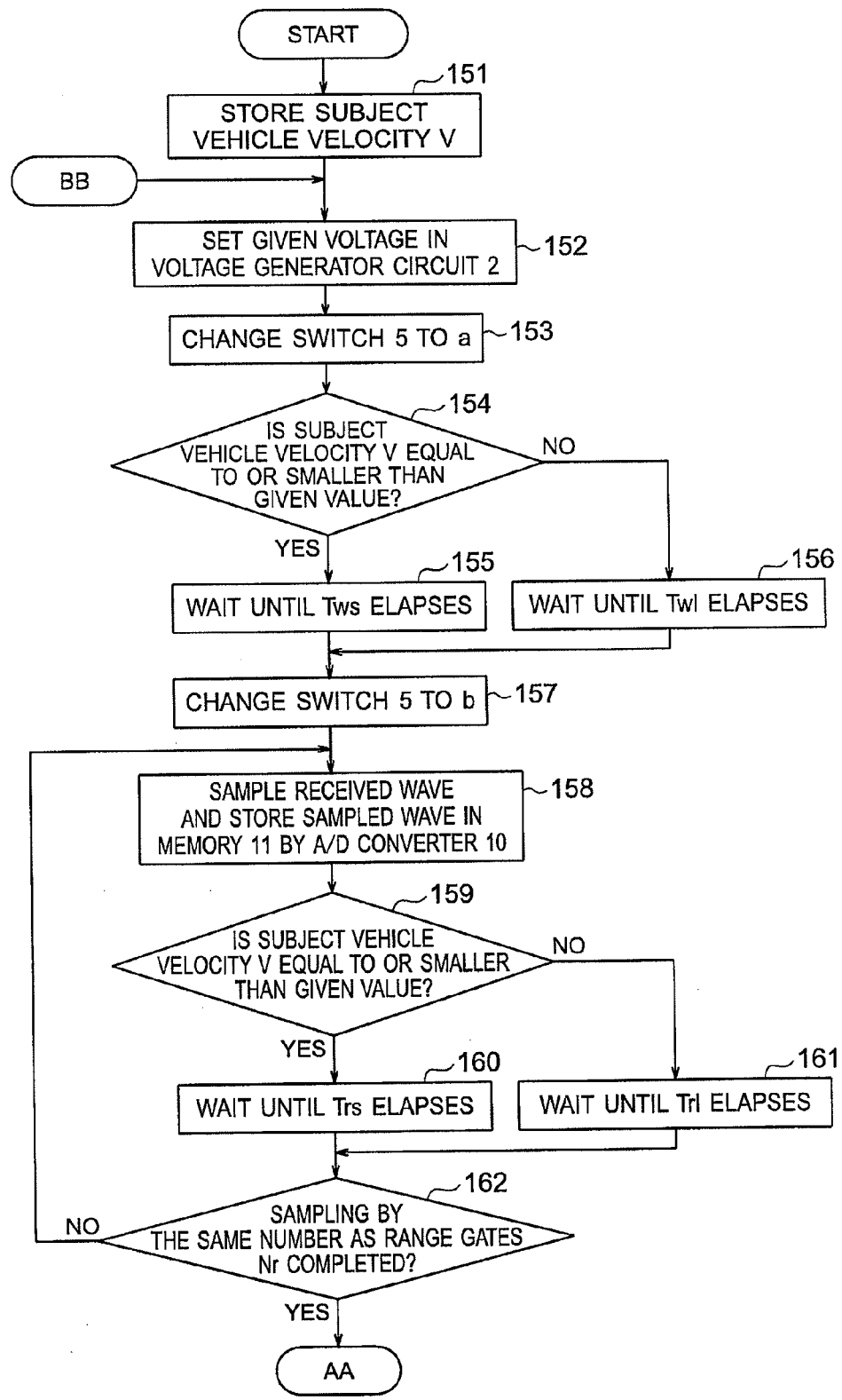
FIG. 9A is a flowchart illustrating a detailed operation of the on-vehicle radar device according to the first embodiment of the present invention.
Figure 9B:
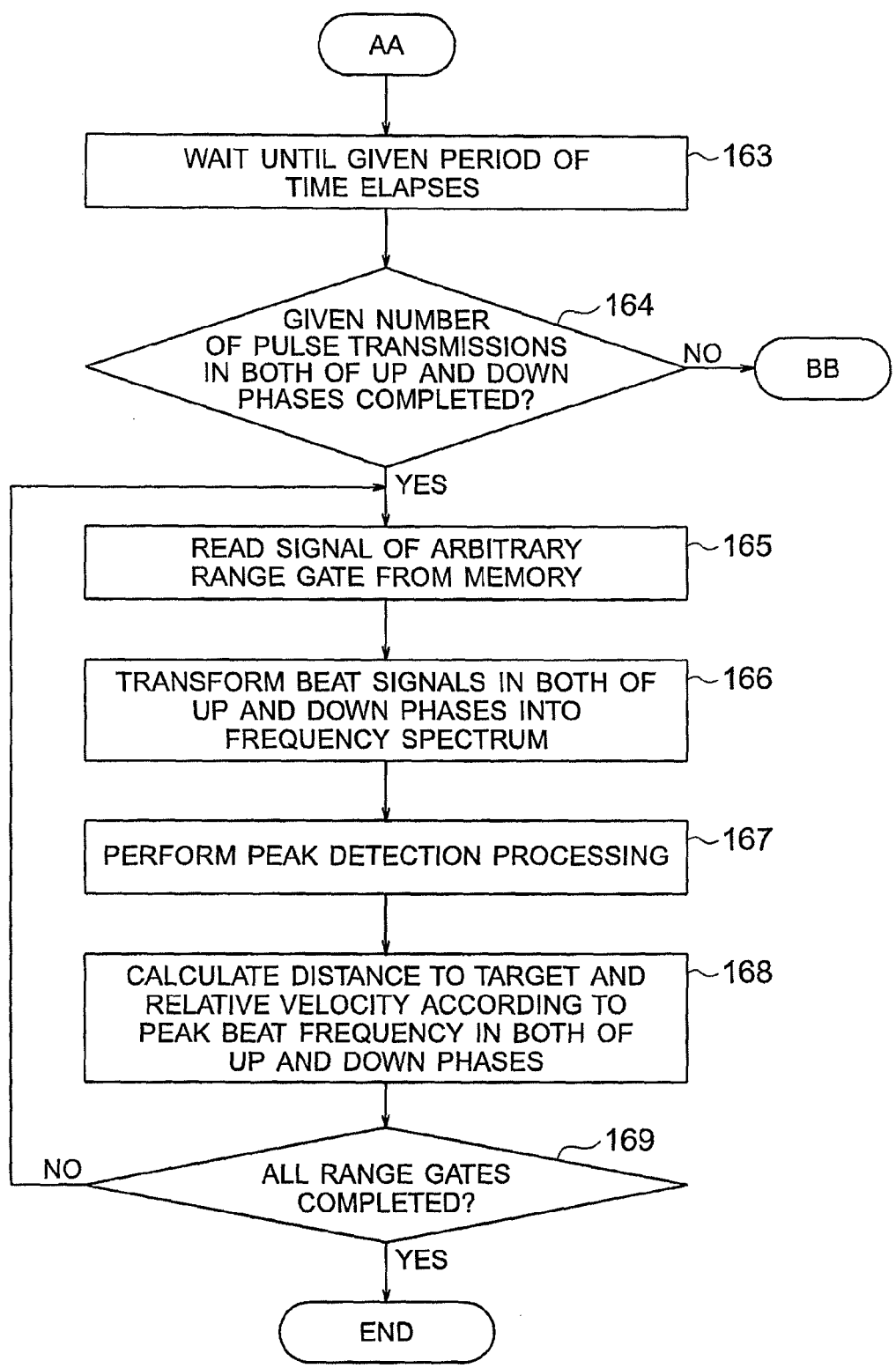
FIG. 9B is a flowchart illustrating the detailed operation of the on-vehicle radar device according to the first embodiment of the present invention.

FIGS. 9A and 9B are flowcharts each illustrating a detailed operation of the on-vehicle radar device according to the first embodiment of the present invention. The respective steps of the operation are described below.

First, in Step 151, the controller 1 stores, in the memory 11, the subject vehicle velocity V at a start point of target detection, which has been acquired from the vehicle velocity detecting means such as a velocity sensor which is installed in the vehicle.

Then, in Step 152, the controller 1 causes the voltage generator circuit 2 to generate a given voltage. This voltage causes the voltage controlled oscillator 3 to generate a given frequency.

Then, in Step 153, the controller 1 changes the switch 5 to the terminal "a" to generate a transmission pulse.

Then, in Step 154, the controller 1 compares the subject vehicle velocity V stored in Step 151 with a velocity threshold value. When the subject vehicle velocity V is equal to or smaller than the velocity threshold value, the controller 1 advances the operation to Step 155. On the other hand, when the subject vehicle velocity V is larger than the velocity threshold value, the controller 1 advances the operation to Step 156.

Then, in Step 155, the controller 1 generates a transmission pulse with a pulse width Tws, and advances the operation to Step 157.

On the other hand, in Step 156, the controller 1 generates a transmission pulse with a pulse width Twl, and advances the operation to Step 157.

Then, in Step 157, the controller 1 changes the switch 5 to the terminal b to terminate the pulse transmission.

Then, in Step 158, the A/D converter 10 samples the received wave, and stores the sampled wave in the memory 11.

Then, in Step 159, the controller 1 compares the subject vehicle velocity V stored in Step 151 with a velocity threshold value. When the subject vehicle velocity V is equal to or smaller than the velocity threshold value, the controller 1 advances the operation to Step 160. On the other hand, when the subject vehicle velocity V is larger than the velocity threshold value, the controller 1 advances the operation to Step 161.

Then, in Step 160, the controller 1 waits only the range gate width Trs, and advances the operation to Step 162.

On the other hand, in Step 161, the controller 1 waits only the range gate width Trl.

Then, in Step 162, the controller 1 advances the operation to Step 158 unless the A/D converter 10 has completed sampling of the waves to the number as that of the range gates Nr, and a given period of time until a subsequent transmission pulse occurs in Step 163 if the A/D converter 10 has completed sampling to the number.

Then, in Step 164, the controller 1 determines whether or not a given number of pulse transmissions have been conducted in both phases of the up chirp and the down chirp. When the given number of pulse transmission has been conducted, the operation is advanced to subsequent Step 162, and when the given number of pulse transmission has not been conducted, the operation is returned to Step 152 where a given voltage is reset in the voltage generator circuit 2.

Because Steps 165 to 169 are identical with Steps 102 to 106 of FIG. 5, a description thereof is omitted.

In the first embodiment, a waiting time corresponding a delay time caused by a circuit configuring the mixer 7, the bandpass filter 8, and the amplifier 9 may be inserted between Step 157 and Step 158.

Further, in the first embodiment, an example in which sampling timing by the analog to digital (A/D) converter 10 is a start of each range gate is described. However, the sampling timing may be anywhere as long as the timing falls within the corresponding range gate.

As described above, according to the first embodiment, the range gate width may be changed according to the subject vehicle velocity, and the range gate width is set to be small when the subject vehicle velocity is small, whereas the range gate width is set to be large when the subject vehicle velocity is large. Therefore, the target at a long distance may be detected without increasing the calculation amount while improving the detection precision of the target in short distance.

Further, the transmission pulse width is changed according to the range gate width, and hence the reflected waves from the targets may be reliably sampled while the reflected waves from the same target may be prevented form being sampled in the plurality of range gates.

Second Embodiment

An on-vehicle radar device according to a second embodiment of the present invention is described. A configuration of the on-vehicle radar device according to the second embodiment of the present invention is similar to that of the above-mentioned first embodiment.

Only parts different from those in the first embodiment are described. According to the second embodiment, the transmission pulse width and the range gate width are set based on a distance to a leading vehicle.

According to the second embodiment, the controller 1 controls the switch 5 and the A/D converter 10 according to the distance to the leading vehicle, to thereby change the transmission pulse width and the range gate width. The distance to the leading vehicle is obtained from, for example, the result calculated by the signal processor 12 by Expression (5).

A method of setting the transmission pulse width and the range gate width based on the distance to the leading vehicle is described in detail.

When the distance to the leading vehicle, which has been acquired from the signal processor 12, is short, the controller 1 determines that a risk of collision is high, and sets the transmission pulse width and the range gate width to be smaller than the reference transmission pulse width and the reference range gate width, to thereby enhance the detection precision. When the distance to the leading vehicle is long, or there is no leading vehicle, the controller 1 sets the transmission pulse width and the range gate width to be larger than the reference transmission pulse width and the reference range gate width for the purpose of detecting the target at a long distance.

Further, in any of the cases where the distance to the leading vehicle is long and short, the controller 1 sets the transmission pulse width to be larger than the reference range gate width and smaller than twice of the reference range gate width.

As described above, according to the second embodiment, the detection precision is changed according to the distance to the target which is actually detected. Therefore, for example, when rapidly cutting in front of the subject vehicle occurs when the subject vehicle travels on a free way, the detection precision may be enhanced.

As described above, the controller 1 of the on-vehicle radar device according to the second embodiment changes the transmission pulse width and the range gate width based on the distance to the leading vehicle.

Specifically, when the distance to the leading vehicle is equal to or smaller than a distance threshold value, the controller 1 sets the transmission pulse width and the range gate width to be smaller than the reference transmission pulse width and the reference range gate width. When the distance to the leading vehicle is larger than the distance threshold value, the controller 1 sets the transmission pulse width and the range gate width to be larger than the reference transmission pulse width and the reference range gate width.

Third Embodiment

Figure 10:
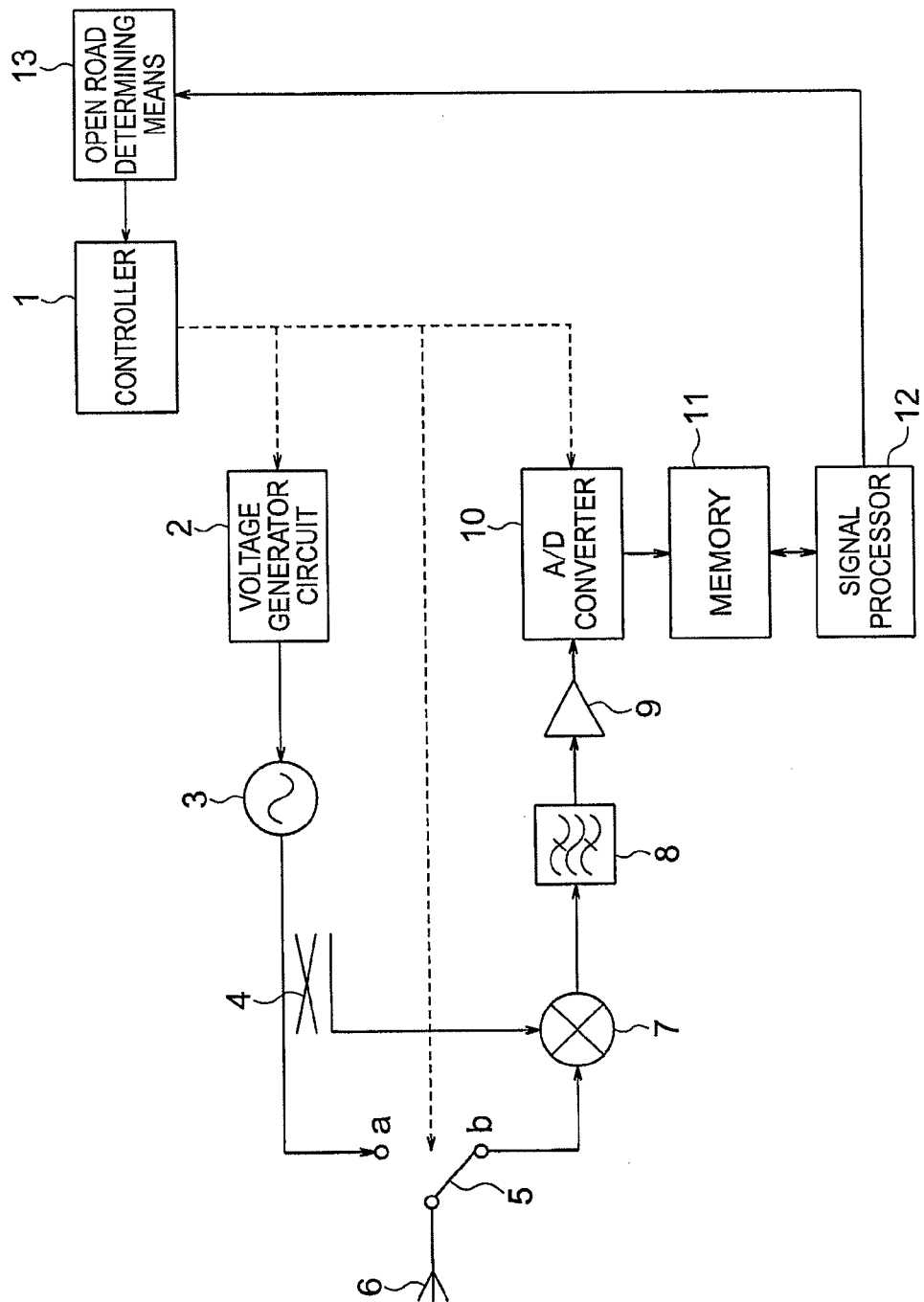
FIG. 10 is a diagram illustrating a configuration of an on-vehicle radar device according to a third embodiment of the present invention.

An on-vehicle radar device according to a third embodiment of the present invention is described with reference to FIGS. 10 to 11B. FIG. 10 is a diagram illustrating a configuration of the on-vehicle radar device according to the third embodiment of the present invention.

According to the third embodiment, the controller 1 changes the transmission pulse width and the range gate width based on the determination result of open road determining means 13 for determining whether the subject vehicle is traveling on an open road or a free way.

Only parts different from those in the first embodiment are described. The open road determining means 13 determines whether the subject vehicle is traveling on an open road or a highway, according to the subject vehicle velocity and the distance to the leading vehicle. Specifically, when the distance to the leading vehicle, which has been acquired from the signal processor 12, is equal to or smaller than the distance threshold value, the open road determining means 13 determines that the subject vehicle is traveling on an open road.

When the distance to the leading vehicle is larger than the distance threshold value, and the subject vehicle velocity acquired from the vehicle velocity detecting means is equal to or smaller than the velocity threshold value, the open road determining means 13 determines that the subject vehicle is traveling on an open road. On the other hand, when the distance to the leading vehicle is larger than the distance threshold value, and the subject vehicle velocity is larger than the velocity threshold value, the open road determining means 13 determines that the subject vehicle is traveling on a highway.

When the open road determining means 13 determines that the subject vehicle is traveling on an open road, the controller 1 gives importance to the detection of the target at a long distance, and sets the transmission pulse width and the range gate width to be larger than the reference transmission pulse width and the reference range gate width.

Further, in any of the cases where the open road determining means 13 determines that the subject vehicle is traveling on an open road and on a highway, the controller 1 sets the transmission pulse width to be larger than the reference range gate width and smaller than twice of the reference range gate width.

Figure 11A:
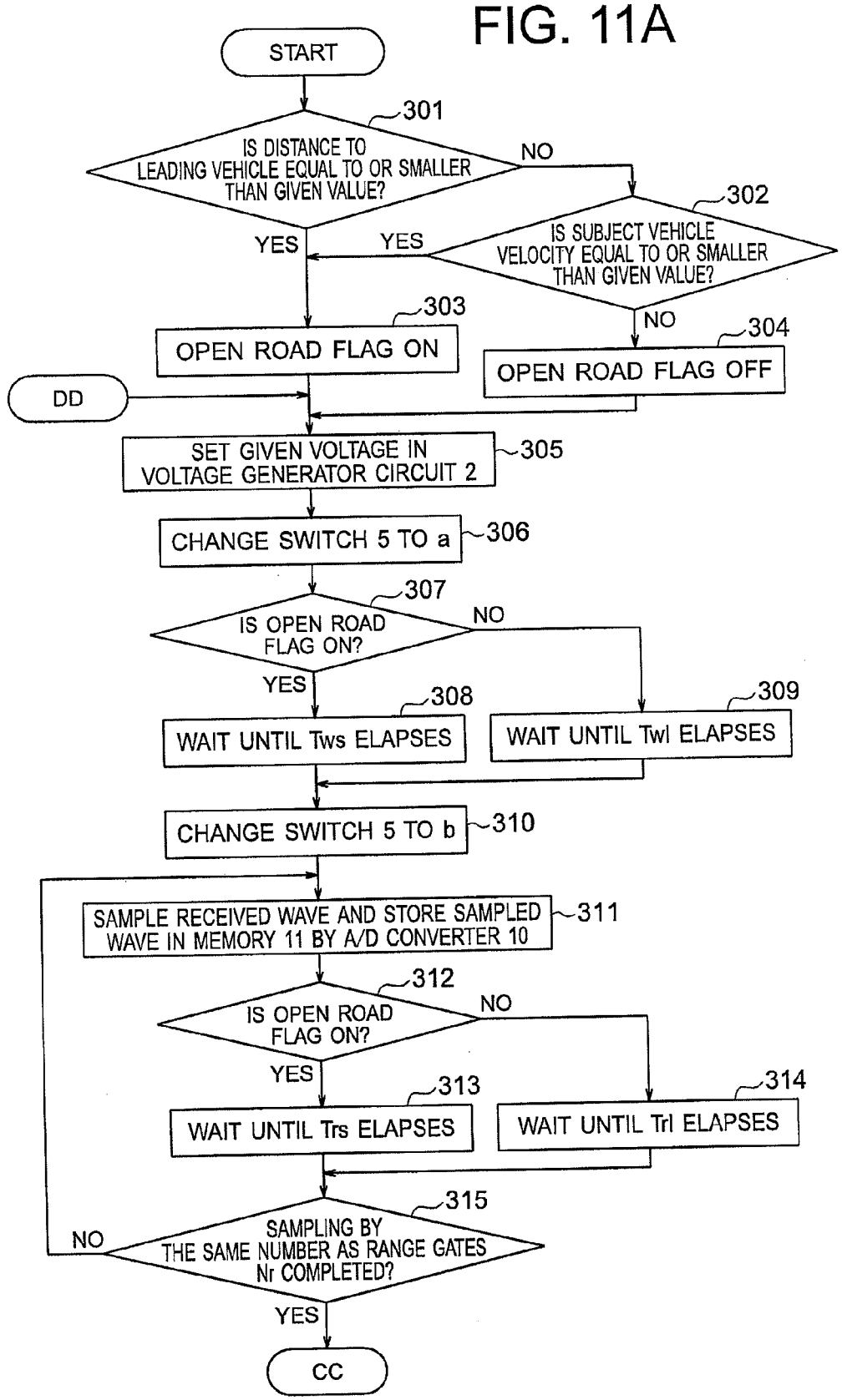
FIG. 11A is a flowchart illustrating a detailed operation of the on-vehicle radar device according to the third embodiment of the present invention.
Figure 11B:
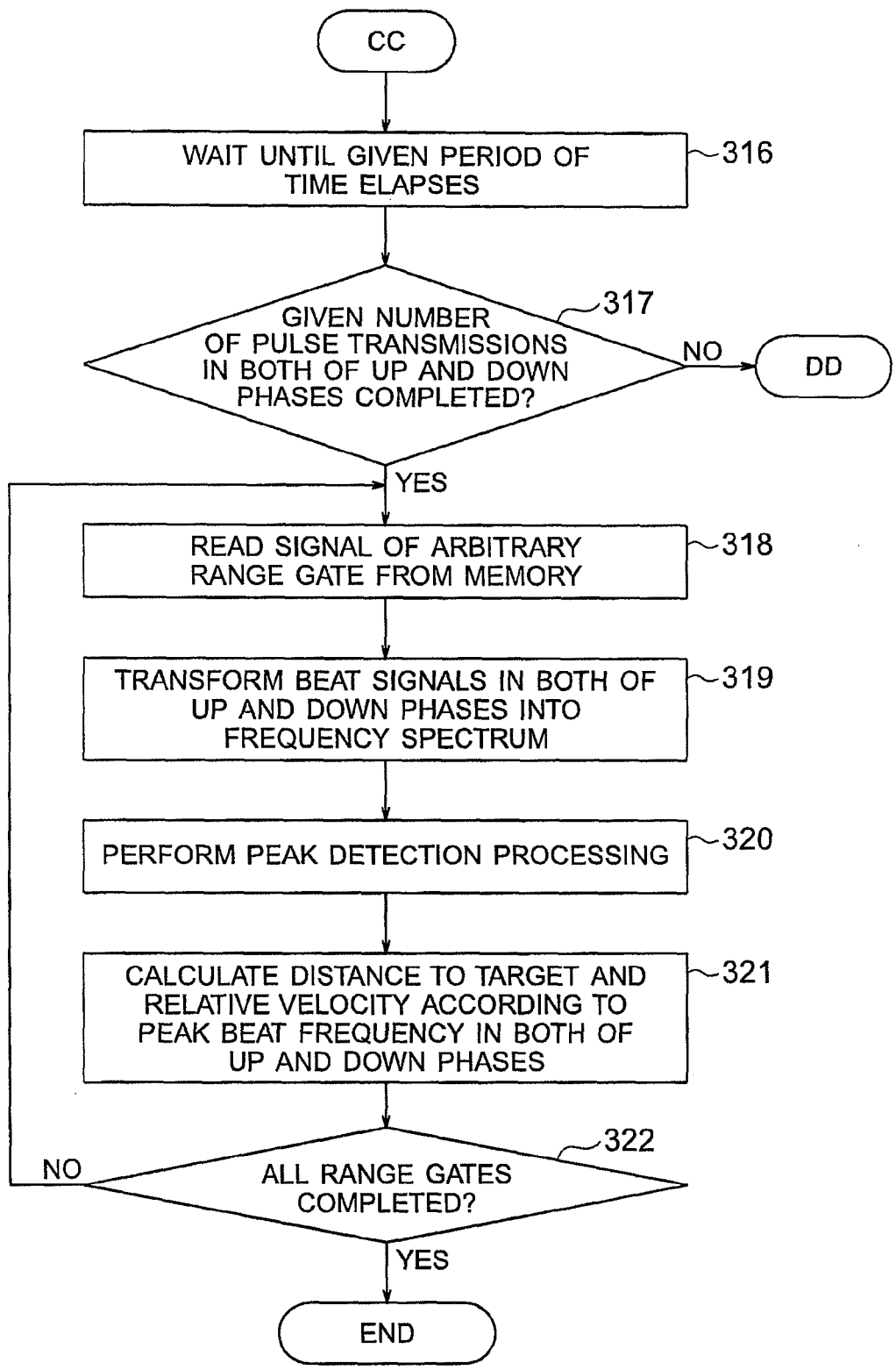
FIG. 11B is a flowchart illustrating the detailed operation of the on-vehicle radar device according to the third embodiment of the present invention.

FIGS. 11A and 11B are flowcharts each illustrating a detailed operation of the on-vehicle radar device according to the third embodiment of the present invention.

First, in Step 301, the open road determining means 13 compares the distance to the leading vehicle, which has been acquired from the signal processor 12, with the distance threshold value. When the distance to the leading vehicle is equal to or smaller than the distance threshold value, the open road determining means 13 advances the operation to Step 303, and when the distance to the leading vehicle is larger than the distance threshold value, the open road determining means 13 advances the operation to Step 302.

Then, in Step 302, the open road determining means 13 compares the subject vehicle velocity, which has been acquired from the vehicle velocity detecting means, with a velocity threshold value. When the subject vehicle velocity is equal to or smaller than the velocity threshold value, the open road determining means 13 advances the operation to Step 303. On the other hand, when the subject vehicle velocity is larger than the velocity threshold value, the controller 1 advances the operation to Step 304.

Then, in Step 303, the open road determining means 13 turns on an open road flag, and advances the operation to Step 305.

Then, in Step 304, the open road determining means 13 turns off an open road flag.

Then, in Step 305, the controller 1 causes the voltage generator circuit 2 to generate a given voltage. This voltage makes the voltage controlled oscillator 3 generate a given frequency.

Then, in Step 306, the controller 1 changes the switch 5 to the terminal "a" to generate a transmission pulse.

Then, in Step 307, the controller 1 determines whether or not the open road flag is on. When the open road flag is on, the controller 1 advances the operation to Step 308, and when the open road flag is off, the controller 1 advances the operation to Step 309.

Then, in Step 308, the controller 1 generates a transmission pulse with a pulse width Tws, and advances the operation to Step 310.

Then, in Step 309, the controller 1 generates a transmission pulse with a pulse width Twl.

Then, in Step 310, the controller 1 changes the switch 5 to the terminal b to terminate the pulse transmission.

Then, in Step 311, the A/D converter 10 samples the received wave, and stores the sampled wave in the memory 11.

Then, in Step 312, the controller 1 determines whether or not the open road flag is on. When the open road flag is on, the controller 1 advances the operation to Step 313, and when the open road flag is off, the controller 1 advances the operation to Step 314.

Then, in Step 313, the controller 1 waits the range gate width Trs, and advances the operation to Step 315.

Then, in Step 314, the controller 1 waits the range gate width Trl.

Because Steps 315 to 322 are identical with Steps 162 to 169 of FIGS. 9A and 9B, a description thereof is omitted.

In the third embodiment, a waiting time corresponding to a delay time caused by a circuit configuring the mixer 7, the bandpass filter 8, and the amplifier 9 may be inserted between Step 310 and Step 311.

Further, in the third embodiment, an example in which sampling timing by the analog to digital (A/D) converter 10 is a start of each range gate is described. However, the sampling timing may be anywhere as long as the timing falls within the corresponding range gate.

As described above, according to the third embodiment, it is determined whether or not the subject vehicle is traveling on the open road, based on the subject vehicle velocity and the distance to the leading vehicle, and the transmission pulse width and the range gate width are set based on the determination result. Therefore, the short-distance precision may be appropriately improved according to the travel state. This is effective in the case where the distance to the leading vehicle is long even when the subject vehicle is traveling on the open road where rushing out into the road and cutting in front of the subject vehicle frequently occur. Further, even when the subject vehicle is traveling on the highway, the short-distance precision may be improved even when rapid cutting in front of the subject vehicle occurs.

The open road determining means 13 of the on-vehicle radar device according to the third embodiment may employ, for example, the number of targets which has been acquired from the signal processor 12 for detecting the targets, as a determination criterion of whether the subject vehicle is traveling on the open road or the highway. That is, the open road determining means 13 determines that the subject vehicle is traveling on the open road when the number of targets is equal to or larger than a target threshold value, and determines that the subject vehicle is traveling on the highway when the number of targets is smaller than the target threshold value.

Further, the open road determining means 13 may employ information from a navigation system to determine that the subject vehicle is traveling on the open road or the highway, as a determination criterion of whether the subject vehicle is traveling on the open road or the highway.

Further, the open road determining means 13 may employ information from an on-vehicle electronic toll collection system (ETC), as a determination criterion of whether the subject vehicle is traveling on the open road or the highway. In this example, when the on-vehicle ETC determines that the subject vehicle goes out of the highway, the open road determining means 13 determines that the subject vehicle is traveling on the open road. When the on-vehicle ETC determines that the subject vehicle enters the highway, the open road determining means 13 determines that the subject vehicle is traveling on the highway. The ETC is a system that allows the vehicle to pass through a tollgate without stopping at the tollgate when using a toll road. In the system, systems of the vehicle and the tollgate exchange necessary information by the aid of a radio communication to collect tollage. Most of the toll roads are highways.

Fourth Embodiment

An on-vehicle radar device according to a fourth embodiment of the present invention is described with reference to FIGS. 12 to 13B. The configuration of the on-vehicle radar device according to the fourth embodiment of the present invention is identical with that in the first embodiment described above.

Only parts different from those in the above-mentioned fourth embodiment are described. In the fourth embodiment, the range gate width is changed in each of the range gates.

The controller 1 sets a sampling interval to be short in the FM modulated period before a given period of time elapses after the transmission pulse has been transmitted (that is, the range gate width is set to be small), and sets the sampling interval to be long after the given period of time has been elapsed (that is, the range gate width is set to be long).

Figure 12:
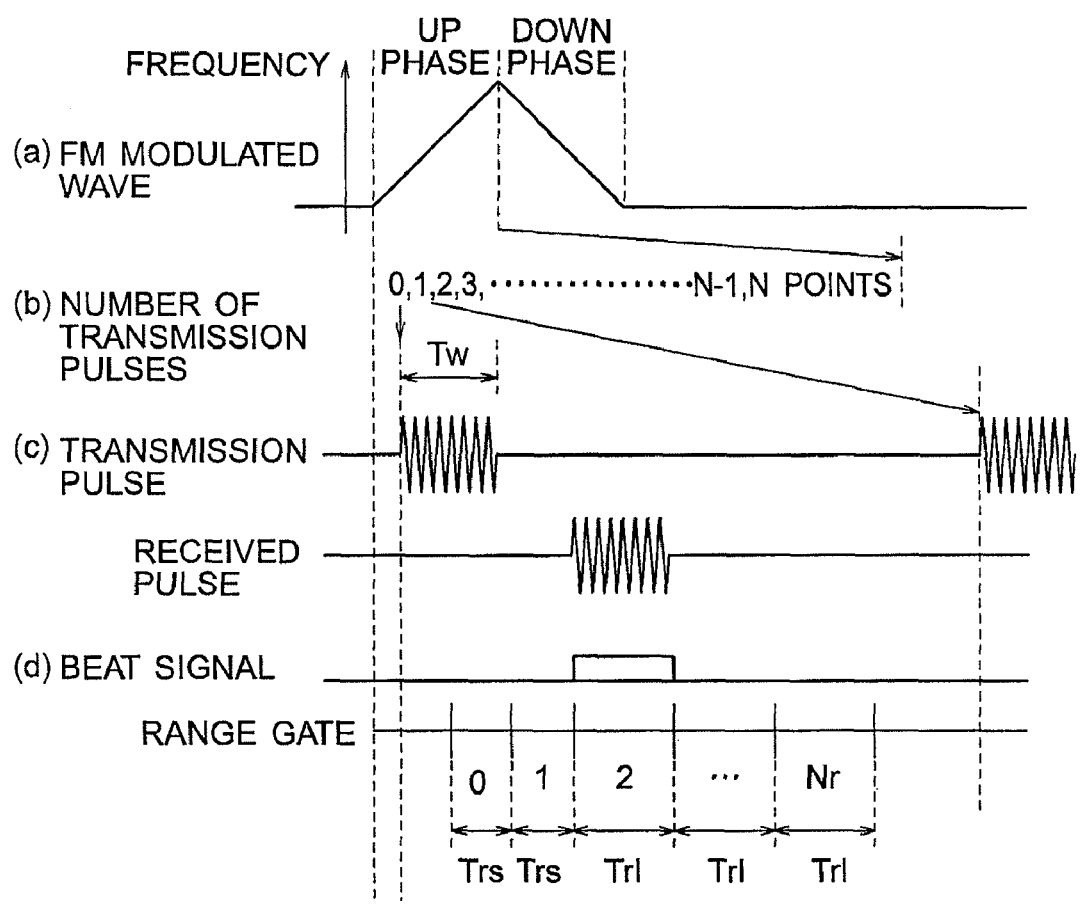
FIG. 12 is a chart for illustrating each timing of an operation of an on-vehicle radar device according to a fourth embodiment of the present invention.

FIG. 12 is a diagram for describing the respective timings of the operation of the on-vehicle radar device according to the fourth embodiment of the present invention, and the respective items (a) to (d) are identical with those in FIG. 4. In this example, the range gates are roughly classified into two range gates of short-distance range gates and long-distance range gates. For example, range gates 0 and 1 are the short-distance range gates, and range gates 2 to Nr are the long-distance range gates.

As illustrated in FIG. 12, each of the short-distance range gates has a range gate width Trs smaller than the reference range gate width, and improves the short-distance detection precision. Each of the long-distance range gates has a range gate width Trl larger than the reference range gate width, and may detect the target at the long distance. The transmission pulse width Tw is set to be larger than the long-distance range gate width Trl so that the received pulses may be sampled by the long-distance range gates.

Figure 13A:
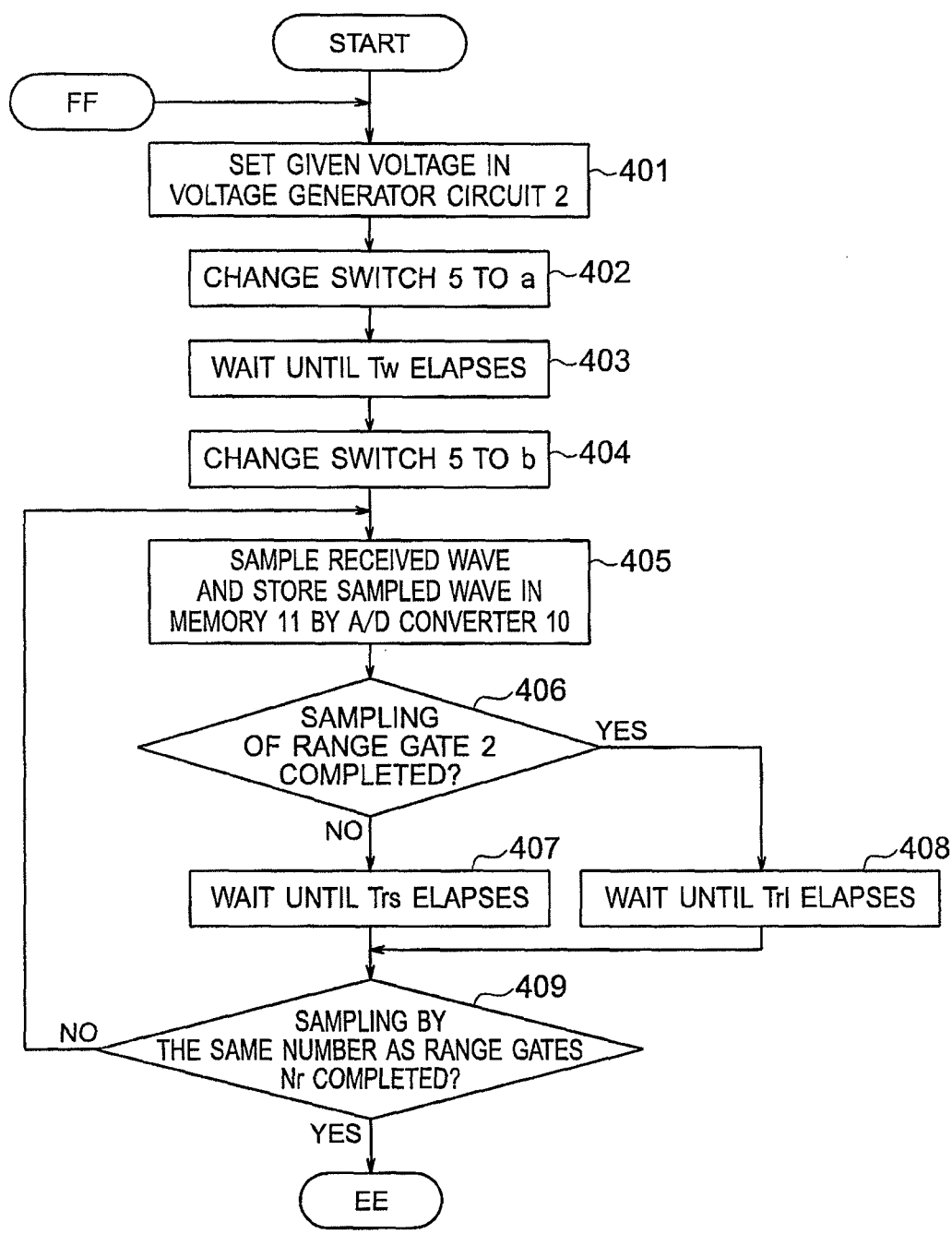
FIG. 13A is a flowchart illustrating a detailed operation of the on-vehicle radar device according to the fourth embodiment of the present invention.
Figure 13B:
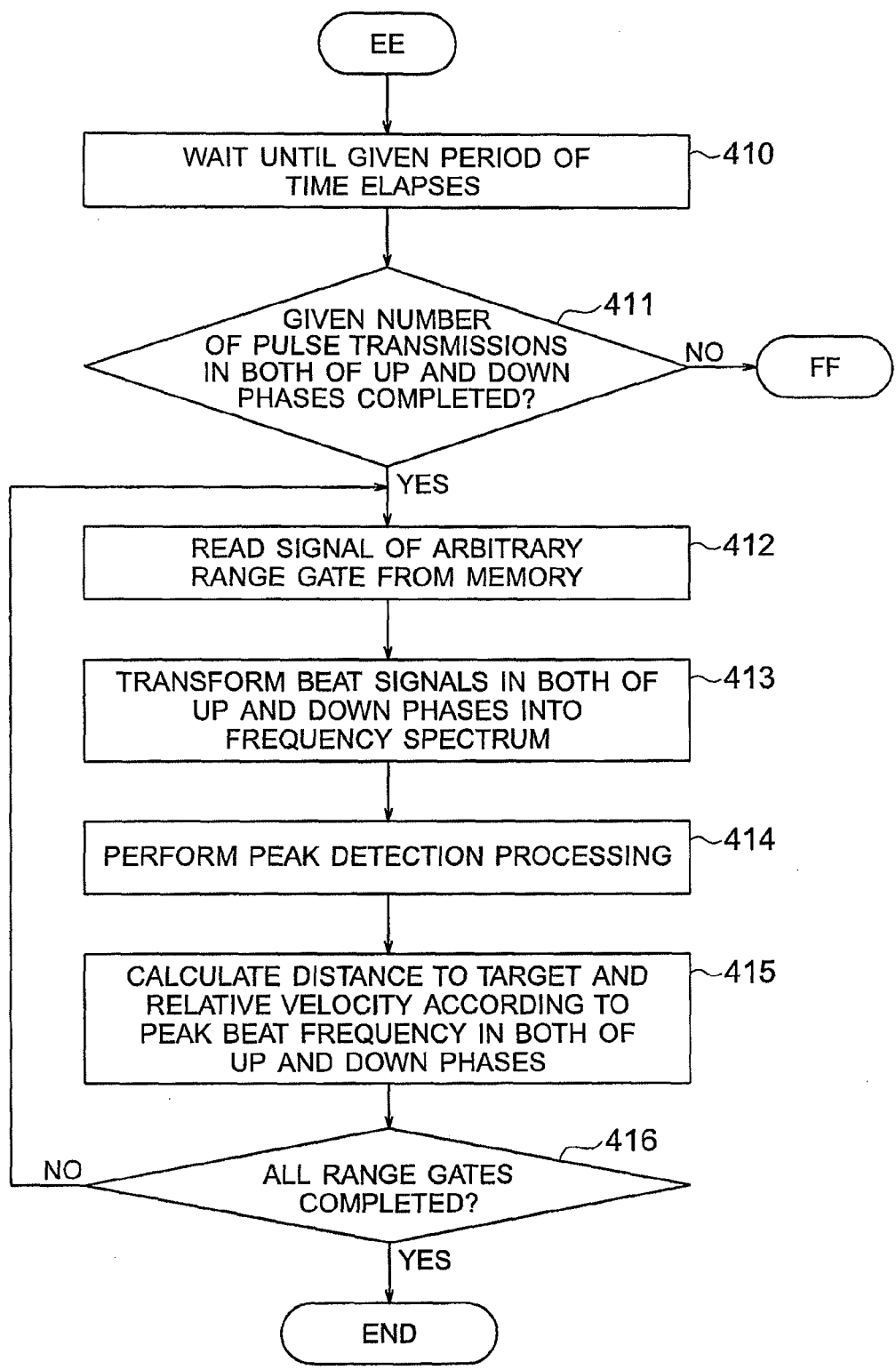
FIG. 13B is a flowchart illustrating the detailed operation of the on-vehicle radar device according to the fourth embodiment of the present invention.

FIGS. 13A and 13B are flowcharts illustrating the detailed operation of the on-vehicle radar device according to the fourth embodiment of the present invention. The respective steps are described below.

First, in Step 401, the controller 1 allows a given voltage to be developed in the voltage generator circuit 2. This voltage makes the voltage controlled oscillator 3 generate a given frequency.

Then, in Step 402, the controller 1 changes the switch 5 to the terminal "a".

Then, in Step 403, the controller 1 generates a transmission pulse with a pulse width Tw.

Then, in Step 404, the controller 1 changes the switch 5 to the terminal b to terminate the pulse transmission.

Then, in Step 405, the A/D converter 10 samples the received wave, and stores the sampled wave in the memory 11.

Then, in Step 406, the controller 1 determines whether or not sampling of the range gate 2 has been completed. If not, the controller 1 advances the operation to Step 407, and if so, the controller 1 advances the operation to Step 408.

Then, in Step 407, the controller 1 waits the range gate width Trs. After that, the controller 1 advances the operation to Step 409.

Then, in Step 408, the controller 1 waits the range gate width Trl.

Then, in Step 409, the controller 1 returns the operation to Step 405 unless the sampling by the same number as that of the range gates Nr is completed, and waits a given period of time until a subsequent transmission pulse occurs in subsequent Step 410 if the sampling by the same number has been completed.

Then, in Step 411, the controller 1 determines whether or not a given number of pulse transmissions has been conducted in both phases of the up chirp and the down chirp. When the given number of pulse transmission has been conducted, the operation is advanced to subsequent Step 412, and when the given number of pulse transmission has not been conducted, the operation is returned to Step 401 where a given voltage is reset in the voltage generator circuit 2.

Because Steps 412 to 416 are identical with Steps 102 to 106 of FIG. 5, a description thereof is omitted.

In the fourth embodiment, an example in which the range gates 0 and 1 are the short-distance range gates, and the range gates 2 to Nr are the long-distance range gates is described. However, a rate of the short-distance range gate and the long-distance range gate may be arbitrarily set.

Further, in FIG. 13A, a waiting time as long as a delay time caused by a circuit configuring the mixer 7, the bandpass filter 8, and the amplifier 9 may be inserted between Step 404 and Step 405.

Further, in the fourth embodiment, an example in which sampling timing by the A/D converter 10 is a start of each range gate is described. However, the sampling timing may be anywhere within the corresponding range gate.

According to the fourth embodiment, the range gates are classified into the short-distance range gates and the long-distance range gates. The short-distance range gates are set to be small in the range gate width, and the long-distance range gates are set to be large in the range gate width to improve the detection precision with respect to the target at the short distance. Further, the target at the long distance may be detected at the same time while suppressing an increase in the calculation amount. This is effective in the case where the target at the short distance and the target at the long distance are detected at the same time as in a radar device that may also detect the long distance.

As described above, the controller 1 of the on-vehicle radar device according to the fourth embodiment changes the range gate width in each of the range gates. That is, the controller 1 sets the short-distance range gate to be small in the range gate width, and the long-distance range gate to be large in the range gate width. Further, the controller 1 sets the transmission pulse width to be larger than the largest range gate width.

Further, in the fourth embodiment, two kinds of range gates such as the short-distance range gate and the long-distance range gate are set. Alternatively, a plurality of range gate widths such as three or more kinds may be set. In this case, the range gate widths are set to be large as the range gates are located at the long distance.

Fifth Embodiment

An on-vehicle radar device according to a fifth embodiment of the present invention is described with reference to FIGS. 14A to 15B. The configuration of the on-vehicle radar device according to the fifth embodiment of the present invention is identical with that in the above-mentioned first embodiment.

Only parts different from those in the above-mentioned first embodiment are described. In the fifth embodiment, the range gate width is changed in each of the range gates, and the range gate width is changed based on the subject vehicle velocity. For simplification of description, an example in which two kinds of range gate widths, that is, the short-distance range gate and the long-distance range gate are provided is described below.

Figure 14A:
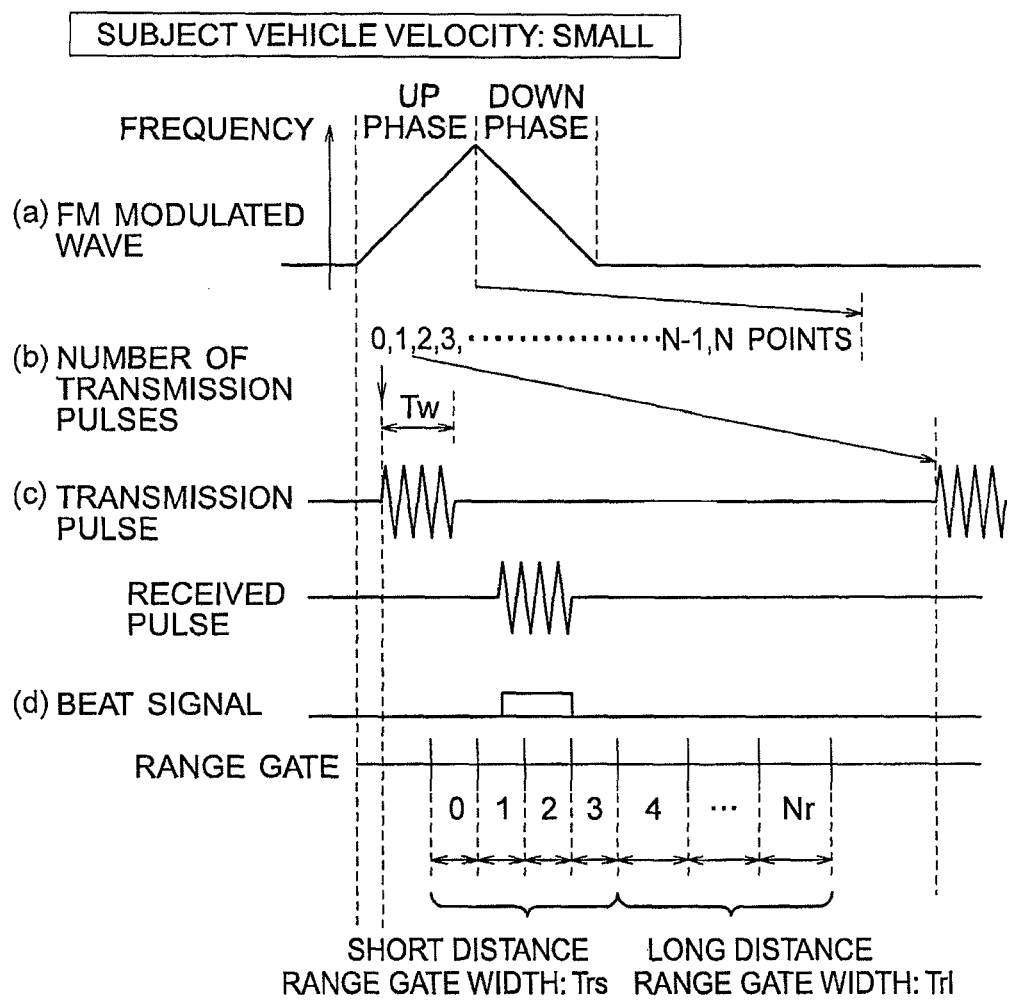
FIG. 14A is a diagram for illustrating each timing of an operation of an on-vehicle radar device according to a fifth embodiment of the present invention.
Figure 14B:
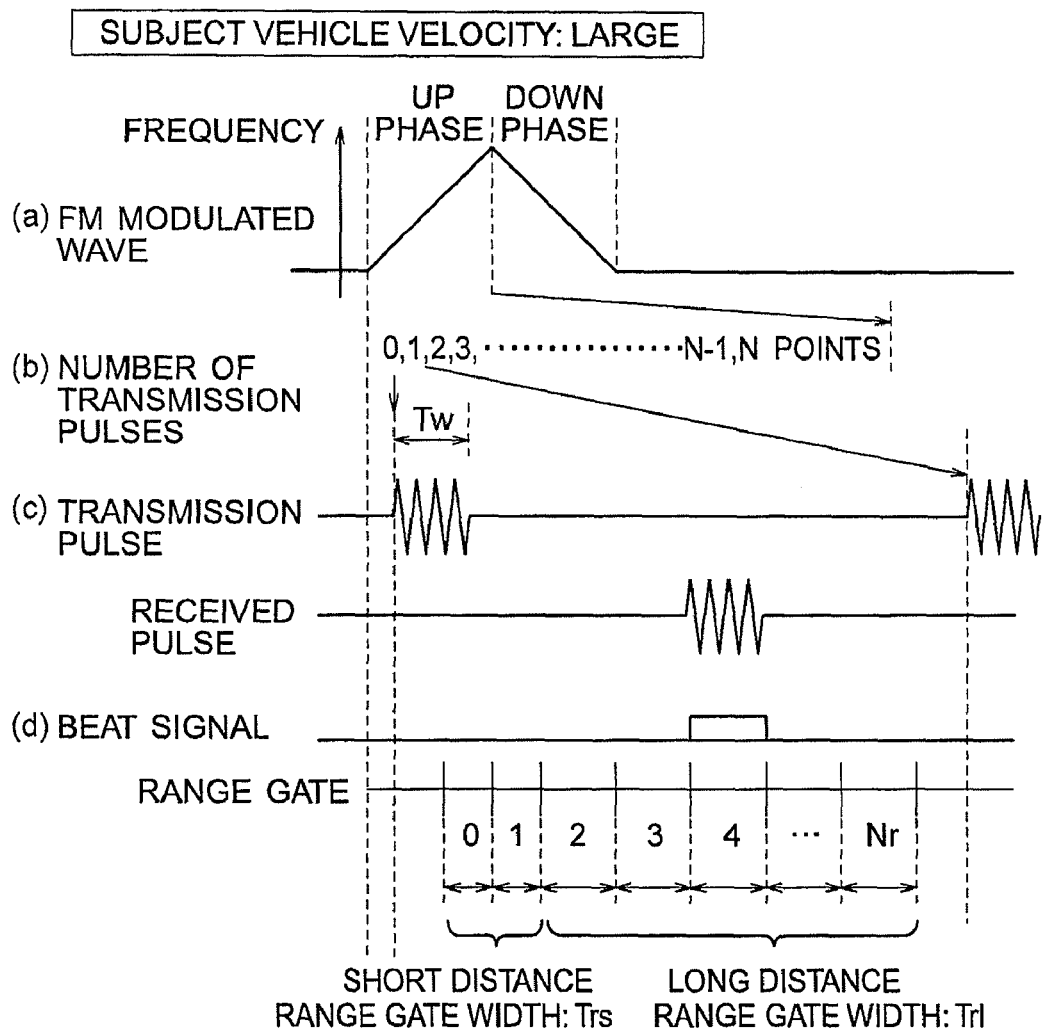
FIG. 14B is a diagram for illustrating each timing of the operation of the on-vehicle radar device according to the fifth embodiment of the present invention.

FIGS. 14A and 14B are diagrams for describing the respective timings of the operation of the on-vehicle radar device according to the fifth embodiment of the present invention, and the respective items (a) to (d) are identical with those in FIG. 4. It is assumed that the range gate width of the short-distance range gate is Trs, and the range gate width of the long-distance range gate is Trl. In this case, Trs<Trl is satisfied.

When the subject vehicle velocity is small, the number of short-distance range gates is increased. For example, the range gates 0 to 3 are the short-distance range gates, and range gates 4 to Nr are the long-distance range gates. When the subject vehicle velocity is large, the number of long-distance range gates is increased. For example, the range gates 0 and 1 are the short-distance range gates, and range gates 3 to Nr are the long-distance range gates. For example, in the case of Nr=9, when the subject vehicle velocity is small, the number of short-distance range gates is 4, and the number of long-distance range gates is 6. When the subject vehicle velocity is large, the number of short-distance range gates is 2, and the number of long-distance range gates is 8. When it is assumed that the number of reference short-distance range gates is 3, and the number of reference long-distance range gates is 7, in the case where the subject vehicle velocity is equal to or smaller than the velocity threshold value, the controller 1 sets the number of short-distance range gates to be larger than the number of reference short-distance range gates. The controller 1 also sets the number of long-distance range gates to be smaller than the number of reference long-distance range gates. In the case where the subject vehicle velocity is larger than the velocity threshold value, the controller 1 sets the number of short-distance range gates to be smaller than the number of reference short-distance range gates. The controller 1 also sets the controller 1 sets the number of long-distance range gates to be larger than the number of reference long-distance range gates. The transmission pulse width Tw is set to be equal to or larger than the range gate width Trl of the long-distance range gates.

When the number of short-distance range gates and the number of long-distance range gates are changed based on the subject vehicle velocity, the target at the long distance may be detected at the same time while improving the short-distance precision. Further, which of the short distance and the long distance may be emphasized may be changed according to the travel state.

Figure 15A:
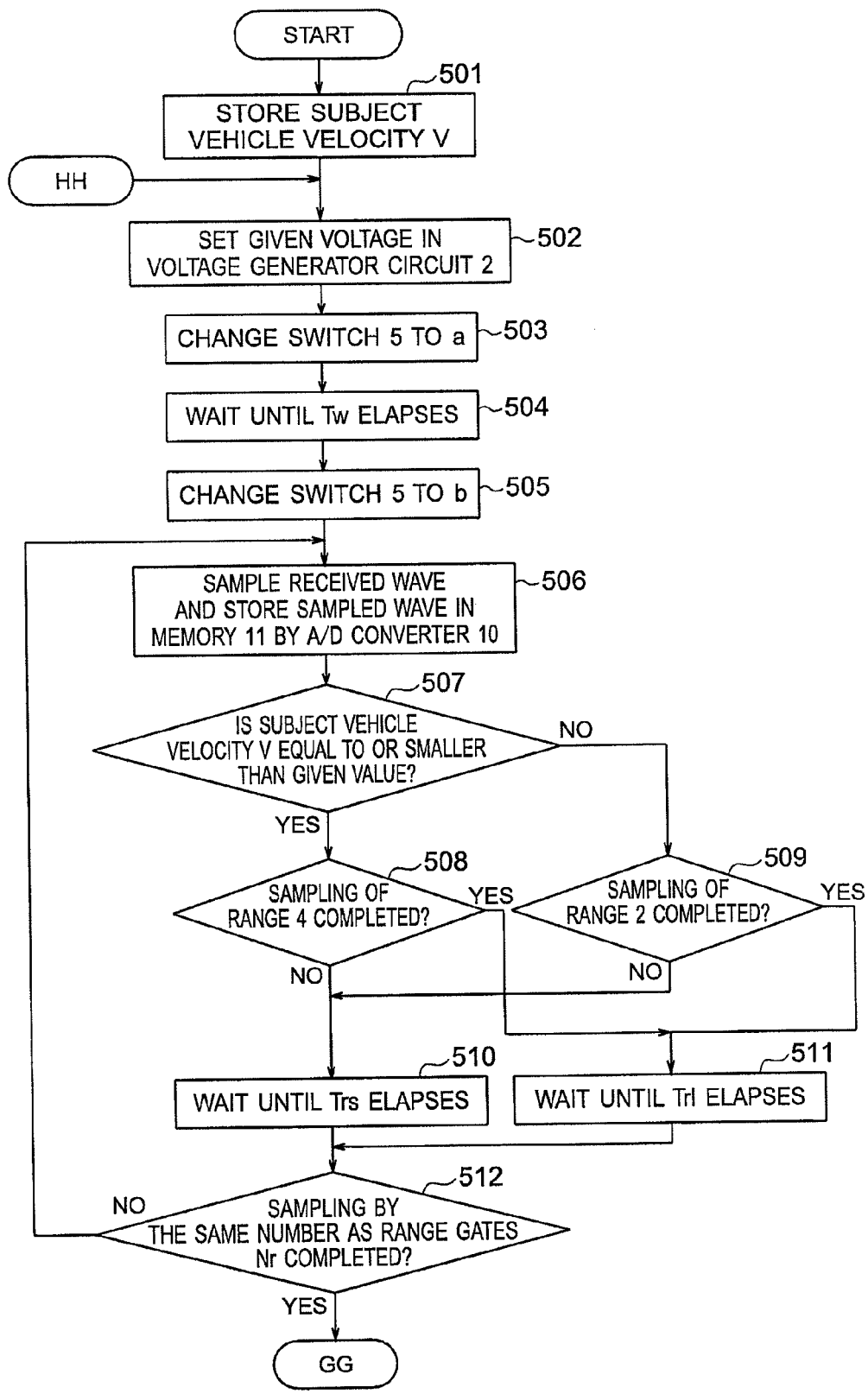
FIG. 15A is a flowchart illustrating a detailed operation of the on-vehicle radar device according to the fifth embodiment of the present invention.
Figure 15B:
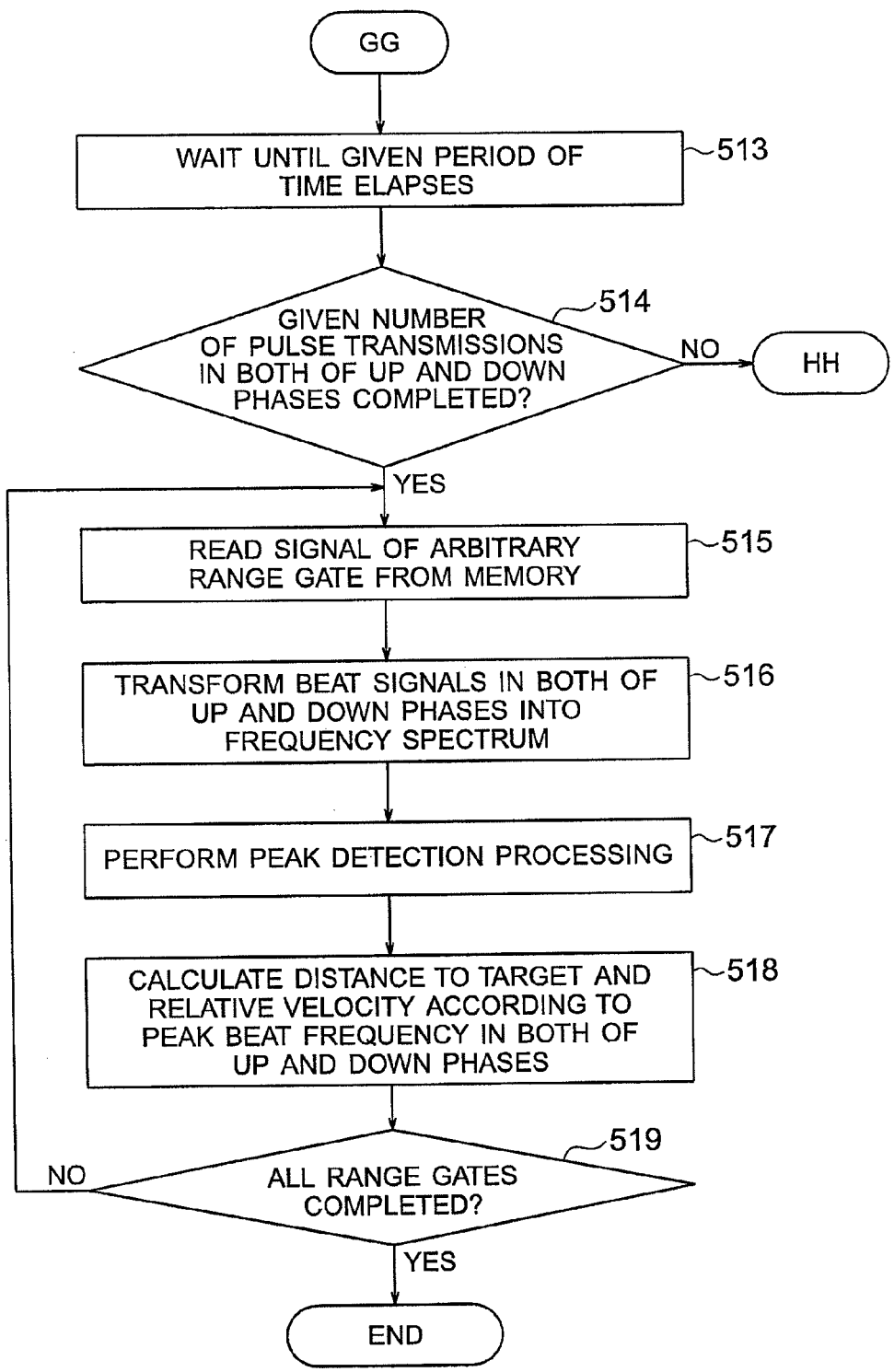
FIG. 15B is a flowchart illustrating the detailed operation of the on-vehicle radar device according to the fifth embodiment of the present invention.

FIGS. 15A and 15B are flowcharts illustrating the detailed operation of the on-vehicle radar device according to the fifth embodiment of the present invention. The respective steps are described below.

First, in Step 501, the controller 1 stores, in the memory 11, the subject vehicle velocity V at a start point of target detection, which has been acquired from the vehicle velocity detecting means such as a velocity sensor which is located in the vehicle.

Then, in Step 502, the controller 1 allows a given voltage to be developed in the voltage generator circuit 2. This voltage makes the voltage controlled oscillator 3 generate a given frequency.

Then, in Step 503, the controller 1 changes the switch 5 to the terminal "a" to generate a transmission pulse.

Then, in Step 504, the controller 1 generates a transmission pulse with a pulse width Tw.

Then, in Step 505, the controller 1 changes the switch 5 to the terminal b to terminate the pulse transmission.

Then, in Step 506, the A/D converter 10 samples the received wave, and stores the sampled wave in the memory 11.

Then, in Step 507, the controller 1 compares the subject vehicle velocity V stored in Step 501 with a velocity threshold value. When the subject vehicle velocity V is equal to or smaller than the velocity threshold value, the controller 1 advances the operation to Step 508. On the other hand, when the subject vehicle velocity V is larger than the velocity threshold value, the controller 1 advances the operation to Step 509.

Then, in Step 508, the controller 1 determines whether or not sampling of the range gate 4 has been completed. If sampling of the range gate 4 has not yet been completed, the controller 1 advances the operation to Step 510, and if sampling of the range gate 4 has been completed, the controller 1 advances the operation to Step 511.

Then, in Step 509, the controller 1 determines whether or not sampling of the range gate 2 has been completed. If sampling of the range gate 2 has not yet been completed, the controller 1 advances the operation to Step 510, and if sampling of the range gate 2 has been completed, the controller 1 advances the operation to Step 511.

Then, in Step 510, the controller 1 waits the short-distance range gate width Trs, and then advances the operation to Step 512.

Then, in Step 511, the controller 1 waits the long-distance range gate width Trl.

Then, in Step 512, the controller 1 returns the operation to Step 506 unless the sampling by the same number as that of the range gates Nr is completed, and waits a given period of time until a subsequent transmission pulse occurs in subsequent Step 513 if the sampling by the same number has completed.

Then, in Step 514, the controller 1 determines whether or not a given number of pulse transmissions has been conducted in both phases of the up chirp and the down chirp. When the given number of pulse transmissions has been conducted, the operation is advanced to subsequent Step 515, and when the given number of pulse transmissions has not been conducted, the operation is returned to Step 502 where a given voltage is reset in the voltage generator circuit 2.

Because Steps 515 to 519 are identical with Steps 102 to 106 of FIG. 5, a description thereof is omitted.

As described above, according to the fifth embodiment, the number of short-distance range gates and the number of long-distance range gates are changed based on the subject vehicle velocity, and hence the target at the long distance may be detected at the same time while improving the short-distance precision. Further, which of the short distance and the long distance may be emphasized may be selected according to the travel state.

The controller 1 of the on-vehicle radar device according to the fifth embodiment of the present invention changes the number of short-distance range gates and the number of the long-distance range gates according to the subject vehicle velocity. That is, the controller 1 sets the number of short-distance range gates to be large when the subject vehicle velocity is small, and sets the number of long-distance range gates to be large when the subject vehicle velocity is large.

In the fifth embodiment, an example in which the number of short-distance range gates and the number of the long-distance range gates are changed according to the subject vehicle velocity is described. Alternatively, the number of short-distance range gates and the number of the long-distance range gates may be changed according to the distance to the leading vehicle. In this case, when the distance to the leading vehicle is short, that is, when the distance to the leading vehicle is equal to or smaller than the distance threshold value, the controller 1 sets the number of short-distance range gates to be larger than the number of reference short-distance range gates, and sets the number of long-distance range gates to be smaller than the number of reference long-distance range gates. When the distance to the leading vehicle is long, that is, when the distance to the leading vehicle is larger than the distance threshold value, the controller 1 sets the number of short-distance range gates to be smaller than the number of reference short-distance range gates, and sets the number of long-distance range gates to be larger than the number of reference long-distance range gates.

The number of short-distance range gates and the number of the long-distance range gates are changed according to the distance to the leading vehicle, and hence when the distance to the leading vehicle is short due to cutting in front of the subject vehicle on the highway with the result that a risk of collision is high, the short-distance detection precision may be improved. Further, when the distance to the leading vehicle is long, the target at the long distance may be detected.

As described above, the controller 1 according to the fifth embodiment of the present invention changes the number of short-distance range gates and the number of the long-distance range gates according to the distance to the leading vehicle. That is, the controller 1 sets the number of short-distance range gates to be large when the distance to the leading vehicle is short, and sets the number of long-distance range gates to be large when the distance to the leading vehicle is long.

In the fifth embodiment, an example in which the number of short-distance range gates and the number of the long-distance range gates are changed according to the subject vehicle velocity or the distance to the leading vehicle is described. Alternatively, the number of short-distance range gates and the number of the long-distance range gates may be changed according to the number of detected targets, information from a navigation system, and information from an on-vehicle ETC.

Further, in the fifth embodiment, two kinds of range gates such as the short-distance range gate and the long-distance range gate are set. Alternatively, three or more kinds of range gate widths may be set. In this case, the transmission pulse width is set to be larger than the largest range gate width.

Sixth Embodiment

An on-vehicle radar device according to a sixth embodiment of the present invention is described with reference to FIGS. 16A to 18B. The configuration of the on-vehicle radar device according to the sixth embodiment of the present invention is identical with that in the above-mentioned first embodiment.

Figure 16A:
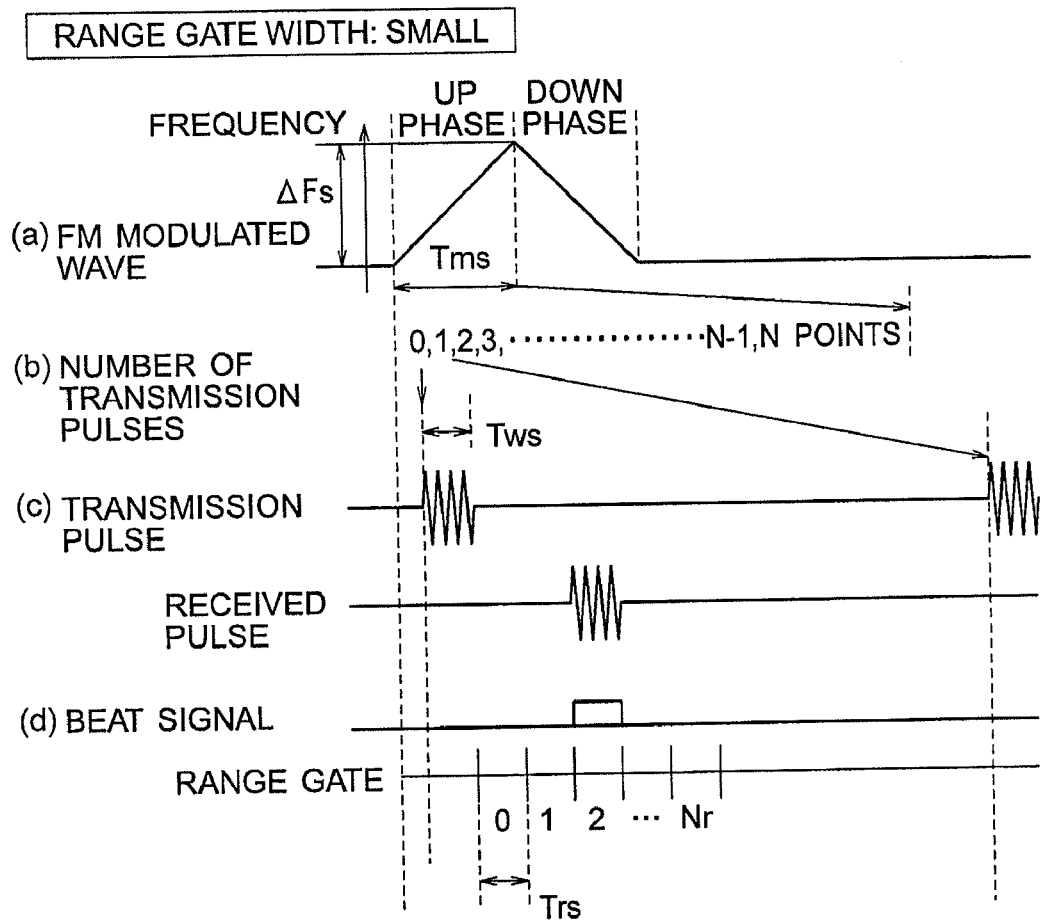
FIG. 16A is a diagram for illustrating each timing of an operation of an on-vehicle radar device according to a sixth embodiment of the present invention.
Figure 16B:
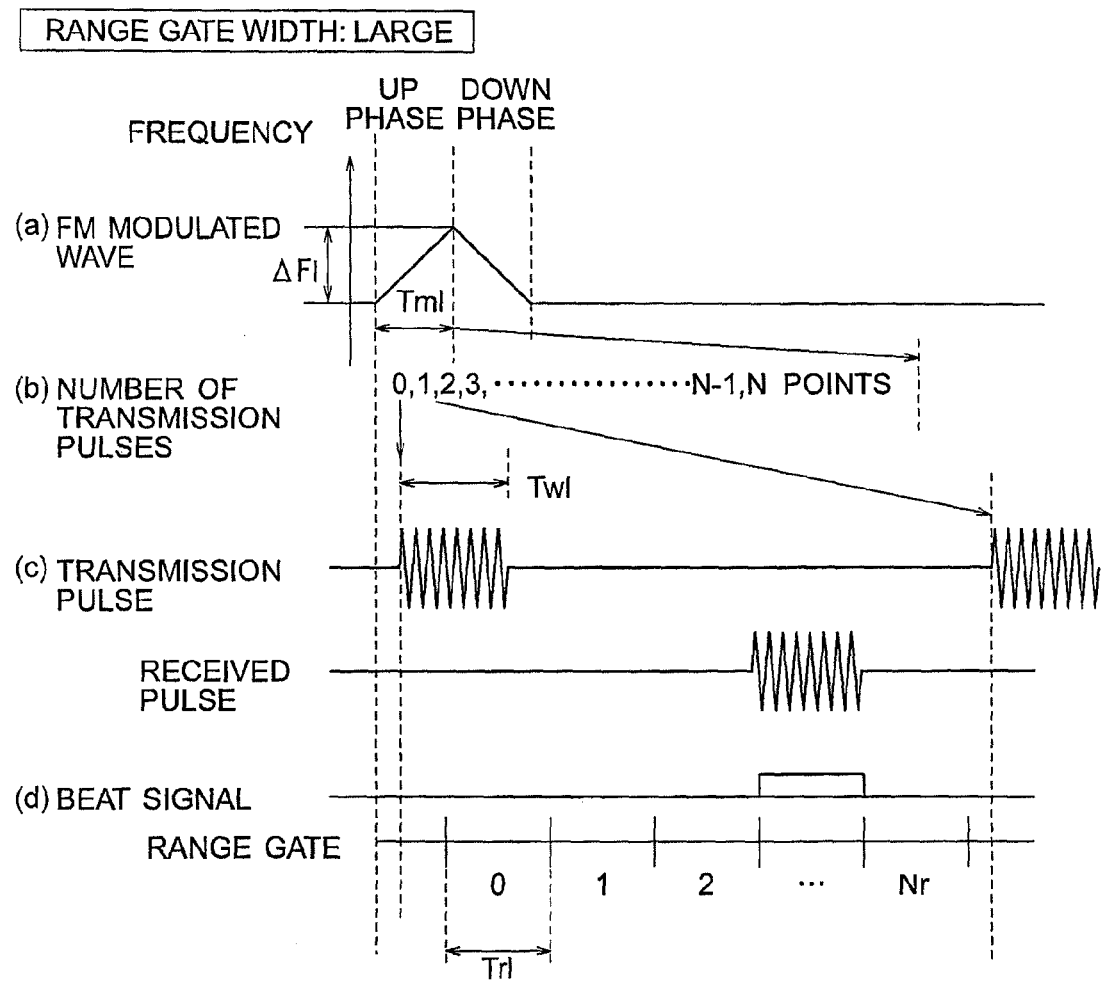
FIG. 16B is a diagram for illustrating each timing of the operation of the on-vehicle radar device according to the sixth embodiment of the present invention.

Only parts different from those in the above-mentioned first embodiment are described. FIGS. 16A and 16B are diagrams for describing the respective timings of the operation of the on-vehicle radar device according to the sixth embodiment of the present invention, and the respective items (a) to (d) are identical with those in FIG. 4.

In the sixth embodiment, the controller 1 changes the range gate width as well as the frequency modulation width and the modulation time. When the range gate width is set to be smaller than the reference range gate width, the controller 1 sets the frequency modulation width to be larger than a reference frequency modulation width ($\Delta Fs$), and sets the modulation time to be longer than a reference modulation time (Tms). Further, when the range gate width is set to be larger than the reference range gate width, the controller 1 sets the frequency modulation width to be smaller than the reference frequency modulation width ($\Delta Fl$), and sets the modulation time to be shorter than the reference modulation time (Tml). In this example, $\Delta Fs > \Delta Fl$ and $Tms > Tml$ are satisfied.

The effects obtained by the above-mentioned setting are described. In the on-vehicle radar device, the distance R to the target and the relative velocity V are represented by Expressions (5) and (6) as described above. When it is considered that the frequency of the beat signal obtained in each phase is obtained by the aid of FFT, the step size of the frequency (hereinafter, referred to as "frequency bin") after FFT is determined according to the measurement time (Tm), and given by 1/Tm.

A distance resolution $\Delta R$ and a relative velocity resolution $\Delta V$ are regarded as a distance and a relative velocity per frequency bin, and hence those resolutions are represented by Expressions (5) and (6) as follows.

$$\Delta R = (cTm/2\Delta F) \times (1/Tm) = c/2\Delta F \tag{8}$$

$$\Delta V = (c/2fc) \times (1/Tm) \tag{9}$$

Expression (8) is obtained by substituting a frequency (=1/Tm) per bin for fr in Expression (5), and Expression (9) is obtained by substituting a frequency (=1/Tm) per bin for fd in Expression (6).

As is apparent from Expressions (8) and (9), the distance resolution $\Delta R$ becomes higher as the frequency modulation width $\Delta F$ becomes larger, and the relative velocity resolution $\Delta V$ becomes higher as the modulation time becomes long.

When the range gate width is set to be small, the subject vehicle velocity is normally traveling on the open road, which requires a precision in short distance. As in the sixth embodiment, in the case where the range gate width is set to be small, when the frequency modulation width is set to be large, and the modulation time is set to be long, the distance resolution and the relative velocity resolution become higher. As a result, a further improvement in the precision may be expected.

On the other hand, in the long-distance range gate, the distance resolution and the relative velocity resolution are set to be lower. Now, let us consider a range in which the beat frequency may be taken. As an example, when it is assumed that FFT points are 512, and $\Delta F=150$ [MHz], Tm=7 [ms], fc=76.5 [GHz], and $C=3\times10^8$ [m/s] are met, $\Delta R=1$ [m] and $\Delta V=1$ [m/s] are satisfied.

The beat signal input to the FFT is a real number, and hence the spectrum converted by the FFT is symmetrical with respect to 0 Hz. Therefore, in the case of the FFT of 512 points, 0 to 255 frequency bins are effective.

Figure 17A:
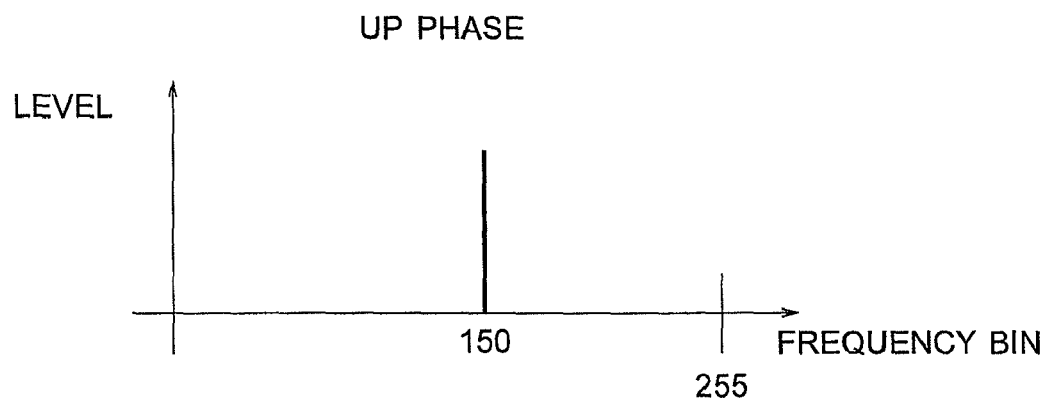
FIG. 17A is a graph for illustrating a behavior of a beat frequency of the on-vehicle radar device according to the sixth embodiment of the present invention.
Figure 17B:
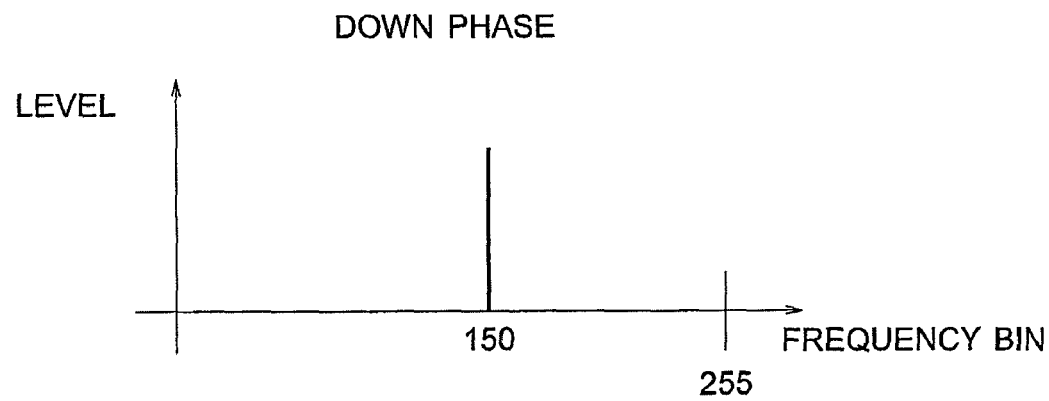
FIG. 17B is a graph for illustrating the behavior of the beat frequency of the on-vehicle radar device according to the sixth embodiment of the present invention.

For example, when it is assumed that "a target of R=150 m and V=0 km/s exists", the frequency bins corresponding to the target in the up phase and the down phase are illustrated in FIGS. 17A and 17B. That is, Ubin=150 and Dbin=150 are satisfied.

Figure 18A:
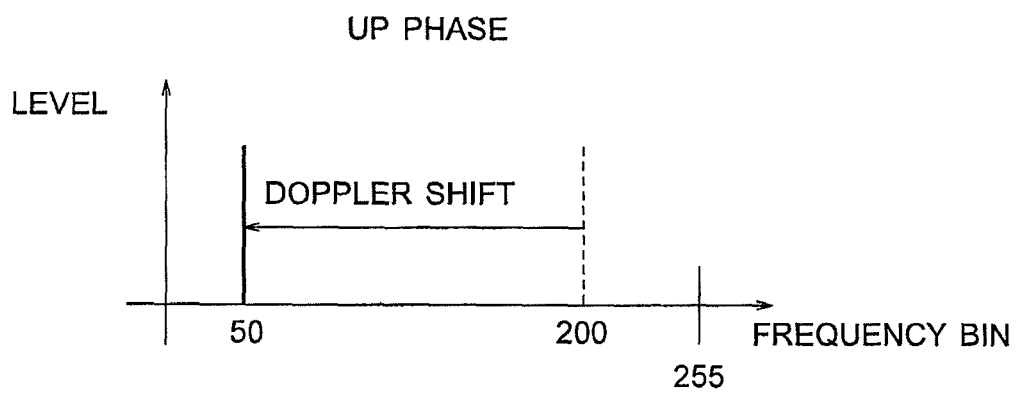
FIG. 18A is a graph for illustrating the behavior of the beat frequency of the on-vehicle radar device according to the sixth embodiment of the present invention.
Figure 18B:
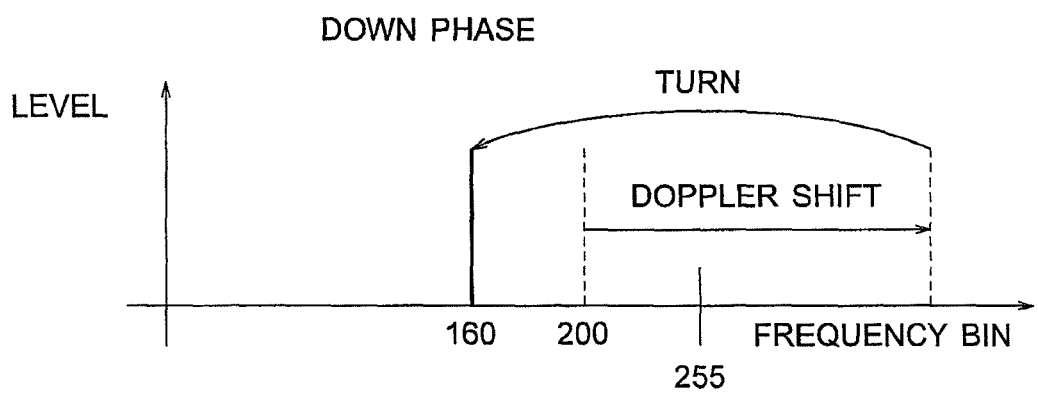
FIG. 18B is a graph for illustrating the behavior of the beat frequency of the on-vehicle radar device according to the sixth embodiment of the present invention.

As another example, a case in which the target approaches the subject vehicle at R=200 m and V=150 km/s is illustrated in FIGS. 18A and 18B. That is, Ubin=50 and Dbin=160 are satisfied, and Dbin appears at a turn position based on 255 bin.

The turn phenomenon is called "range over". In this case, because whether Dbin is at 160 bin by turn or originally at 160 bin is not distinguishable, processing assuming both cases is required. As a result, a processing load becomes high, which is not desirable.

In order to avoid the range over, it is effective that the distance resolution $\Delta R$ and the relative velocity resolution $\Delta V$ are set to be lower. For example, when the FFT point is 512, and ΔF=75 [MHz], Tm=3.5 [ms], fc=76.5 [GHz], and C=3× $10^8$ [m/s] are met, ΔR=2 [m] and ΔV=2 [m/s] are satisfied.

In a case of the target that approaches the subject vehicle at R=200 m and V=150 km/s, Ubin=25 and Dbin=175 are satisfied, and the range over may be prevented.

When the range gate width is set to be large, the subject vehicle is generally traveling on the highway. Because the distance range to the leading vehicle and the relative velocity range are wide, the range over is liable to occur. In the sixth embodiment, in the case where the range gate width is set to be large, when the frequency modulation width is set to be small, and the modulation time is set to be short, the range over hardly occurs, and the correspondence relationship of the beat signals becomes easy to grasp.

As described above, according to the sixth embodiment, when the range gate width is set to be small, the frequency modulation width is set to be large and the modulation time is set to be long, and hence a precision in distance and the relative velocity may be enhanced during travel in the city streets or in traffic jams. Further, when the range gate width is set to be large, the frequency modulation width is set to be small, and the modulation time is set to be short, and hence the range over hardly occurs during travel on the highway, and the correspondence relationship of the beat signal becomes easy to grasp.

As described above, the controller 1 of the on-vehicle radar device according to the sixth embodiment changes the frequency modulation width and the modulation time according to the range gate width. That is, when the range gate width is small, the controller 1 sets the frequency modulation width to be large, and the modulation time to be long. When the range gate width is large, the controller 1 sets the frequency modulation width to be small, and the modulation time to be short.

Seventh Embodiment

Figure 19:
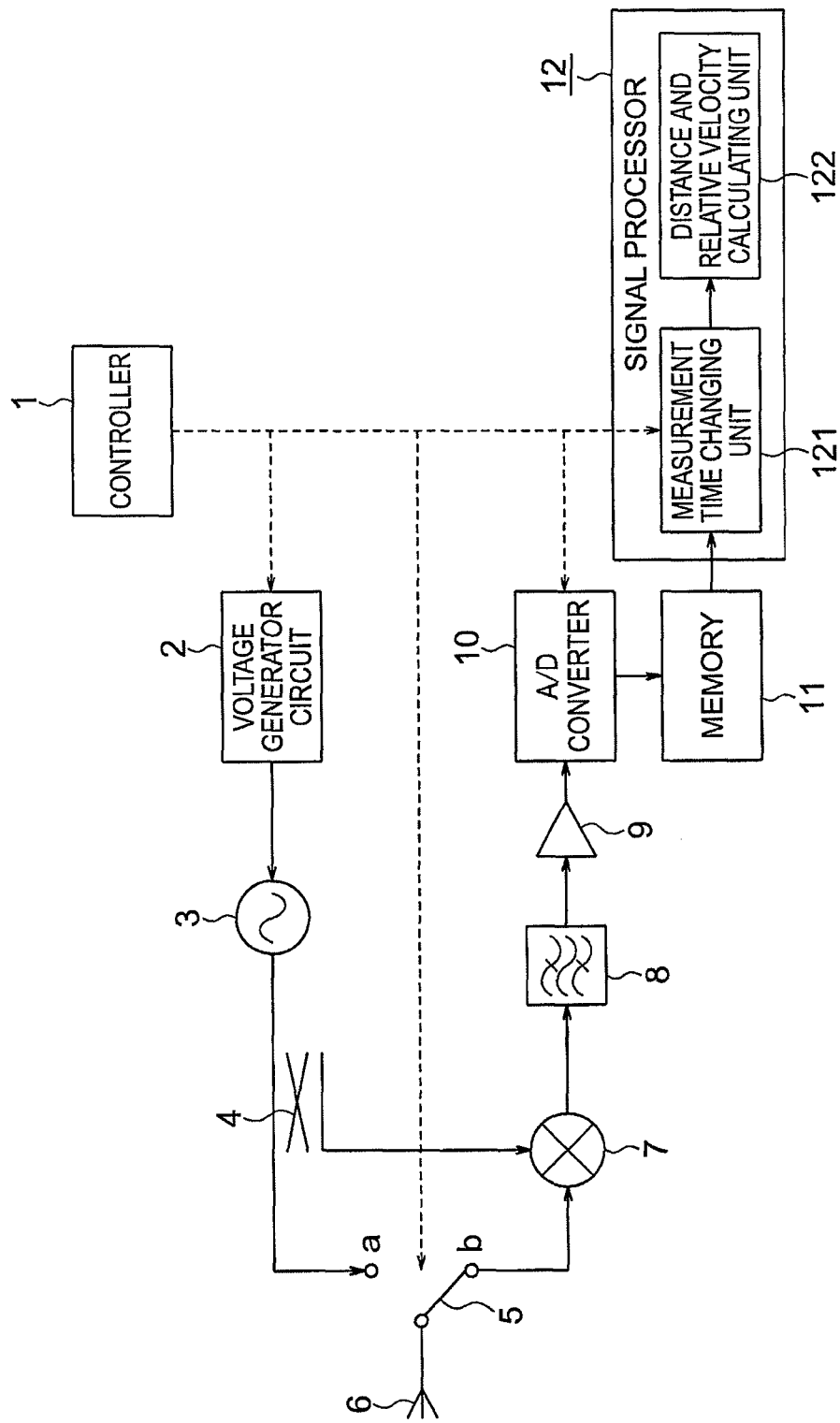
FIG. 19 is a diagram illustrating a configuration of an on-vehicle radar device according to a seventh embodiment of the present invention.

An on-vehicle radar device according to a seventh embodiment of the present invention is described with reference to FIGS. 19 to 21. FIG. 19 is a diagram illustrating the configuration of the on-vehicle radar device according to the seventh embodiment of the present invention.

The on-vehicle radar device according to the seventh embodiment changes data (measurement data) used for real measurement according to the range gate width.

Only parts different from the above-mentioned first embodiment are described. Data sampled by the A/D converter 10 is stored in the memory 11 according to the setting of the range gate width from the controller 1.

A measurement time changing unit (measurement time changing means) 121 is software mounted in the signal processor 12, and sets measurement data (that is, data for measuring the distance to the target and the velocity of the target) used as input of Fourier transform based on the sampling data stored in the memory 11, and changes the measurement time according to the range gate width when a period of time required for sampling since the start till the end of the measurement data is the measurement time.

A distance and relative velocity calculating unit 122 is software mounted in the signal processor 12, and obtains the distance to the target and the relative velocity based on the beat signal.

The operation of the on-vehicle radar device according to the seventh embodiment is identical with that of FIG. 12. In this example, it is assumed that the number of transmission pulses N in the up phase is 1,023 points, two kinds of range gate widths are set, the ranges 0 and 1 are the short-distance range gates (range gate width Trs), and the ranges 2 to N are the long-distance range gates (range gate width Trl). Trs<Trl is satisfied.

A measurement time changing method by the measurement time changing unit 121 is described in detail below. FIG. 20 illustrates a relationship between the measurement data and the modulated signal in the short-distance range gate and the long-distance range gate. Data #0, #1, . . . #1023 illustrated in FIG. 20 correspond to the transmission pulses 0, 1, . . . 1,023 points illustrated in FIG. 12 (N=1,023).

Figure 20:
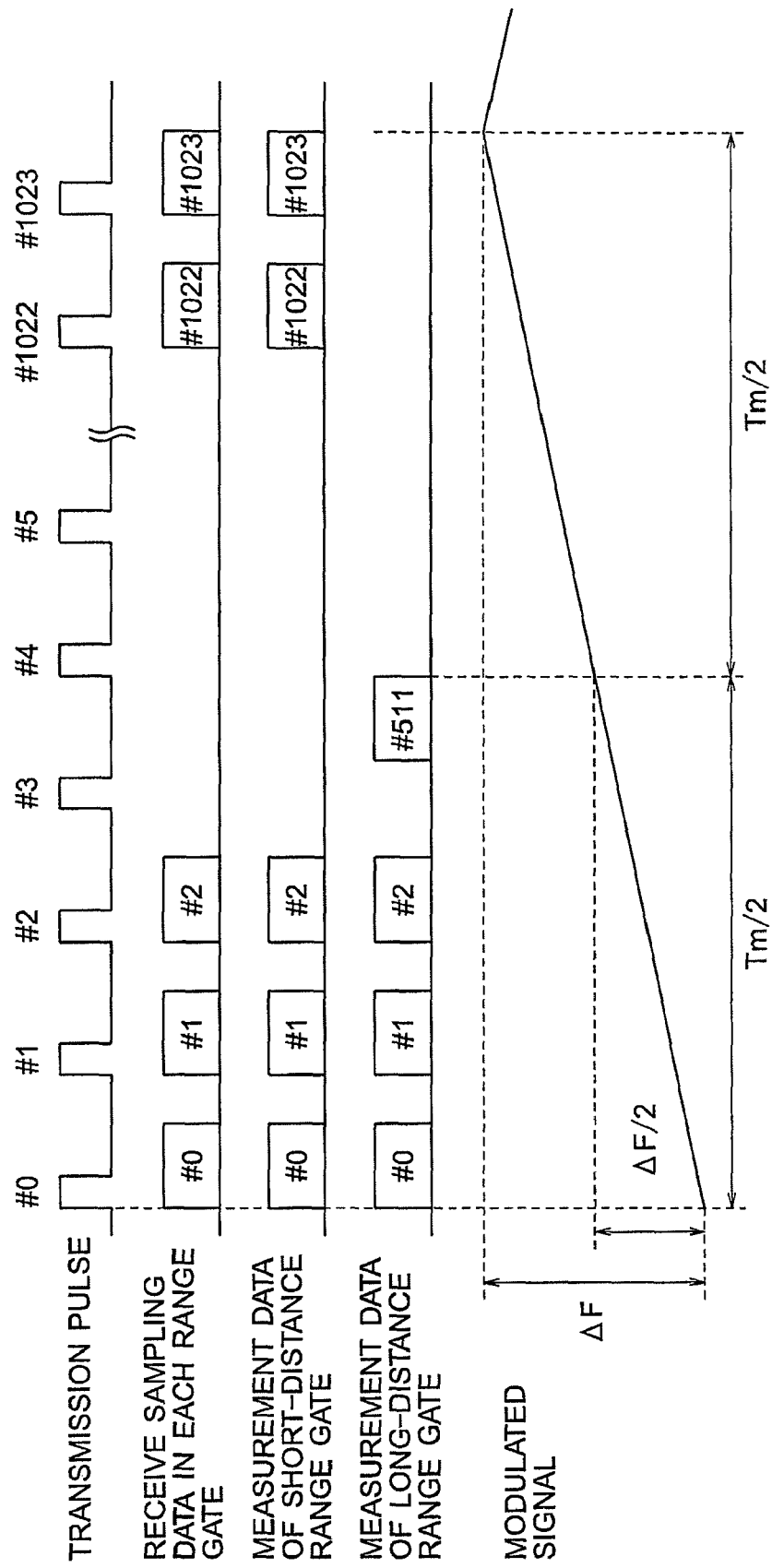
FIG. 20 is a diagram illustrating a relationship between measurement data and a modulated signal in each range gate of the on-vehicle radar device according to the seventh embodiment of the present invention.

As illustrated in FIG. 20, in the short-distance range gate, the sampling data (#0 to #1023) acquired all over the up phase range is used as the measurement data, and in the long-distance range gate, the sampling data (#0 to #511) in half range of the up phase is used as the measurement data.

As a result, in the short-distance range gate, the measurement time is Tm and the frequency modulation width is ΔF, and in the long-distance range gate, the measurement time is Tm/2 and the frequency modulation width is ΔF/2. As described in the above-mentioned sixth embodiment, the measurement time is set to be long and the frequency modulation width is set to be large in the short-distance range gate, and hence the distance resolution and the velocity resolution are enhanced, and the precision with respect to the target at the short distance is improved. On the other hand, in the long-distance range gate, the measurement time is set to be short and the frequency modulation width is set to be small, and hence the range over hardly occurs, and the correspondence relationship of the beat signals becomes easy to grasp.

Further, the measurement data is changed according to the range gate, and hence it is possible to provide a plurality of different range gate widths (two kinds of range gates including the short-distance range gate and the long-distance range gate in the seventh embodiment) with respect to one measurement. With such a configuration, the short-distance range gates may be set to be small in the range gate width, and the long-distance range gate may be set to be large in the range gate width. As a result, the precision may be excellent with respect to the target at the short distance, and at the same time, the target at the long distance may be detected.

Figure 21:
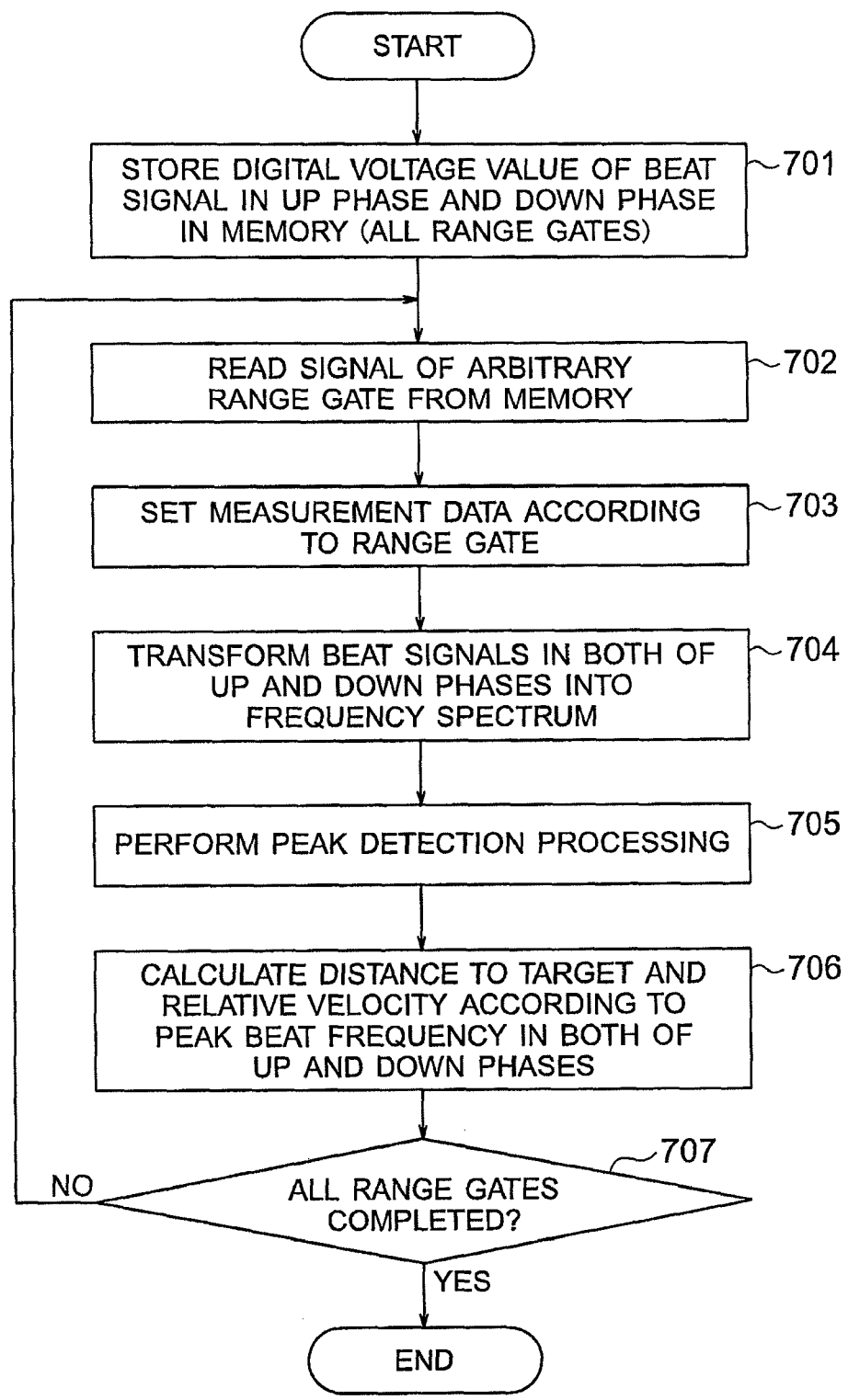
FIG. 21 is a flowchart illustrating an operation of a signal processor in the on-vehicle radar device according to the seventh embodiment of the present invention.

FIG. 21 is a flowchart illustrating the operation of the signal processor in the on-vehicle radar device according to the seventh embodiment of the present invention.

First, in Step 701, the beat signals in the up phase and the down phase are sampled in each range gate, and the digital voltage value is recorded in the memory 11.

Subsequently, in Step 702, a signal of an arbitrary range gate is read from the memory 11.

Then, in Step 703, the measurement data is set with respect to data read in Step 702 according to the range gate.

Then, in Step 704, the measurement data set in Step 703 is subjected to, for example, FFT so as to be transformed into a frequency spectrum. In this example, DFT may be used for frequency transform.

Then, in Step 705, peak detection processing is conducted on the frequency spectrum (that is, beat frequency) obtained in Step 704.

Then, in Step 706, the distance to the target and the relative velocity are calculated according to a peak beat frequency of both of the up and down phases. Each range gate is set in a given distance range, and hence it is checked whether or not the calculated distance falls within the distance range of a subject range gate. If so, the target is formally registered as an object, and if not, the target is not registered.

Then, in Step 707, it is checked whether or not processing has been completed with respect to all of the range gates. If not, the processing is returned to Step 702, and if so, the processing is terminated.

As described above, according to the seventh embodiment, in the case where the range gate width is small, that is, in the case of the target detection during travel in the city streets or in traffic jams, or in short distance, when the measurement data is set to be long, the frequency modulation width becomes large, and the modulation time becomes long. As a result, the precision in the distance and the relative velocity may be enhanced. Further, in the case where the range gate width is large, that is, in the case of the target detection during travel on the highway or in long distance, when the measurement data is set to be small, the frequency modulation width becomes small, and the modulation time becomes short. As a result, the range over hardly occurs, and the correspondence relationship of the beat signals becomes easy to grasp.

As has been described above, the measurement time changing unit 121 of the on-vehicle radar device according to the seventh embodiment changes data (measurement data) used for the real measurement according to the range gate width. That is, the measurement time changing unit 121 sets the measurement time to be long when the range gate width is small, and sets the measurement time to be short when the range gate width is large.

What is claimed is:

1. An on-vehicle radar device, comprising:
   frequency modulating means for modulating a frequency of a transmission signal by a triangular wave;
   transmitting means for pulsing the frequency modulated transmission signal to transmit the pulsed transmission signal as a transmission pulse to a target;
   receiving means for receiving a signal reflected by the target as a received pulse to generate a beat signal based on a frequency difference between a part of the frequency modulated transmission signal and the received pulse;
   range gate setting means for setting a range gate that determines a sampling timing of the received pulse based on a transmitting timing of the transmission pulse;
   sampling means for sampling the beat signal in each of set range gates;
   distance and relative velocity calculating means for calculating a distance to the target and a relative velocity of the target based on the sampled beat signal; and
   control means for controlling the frequency modulating means, the transmitting means, and the range gate setting means to change a transmission pulse width and a range gate width depending on a subject vehicle velocity acquired from vehicle velocity detecting means at a timing of the frequency modulation.

2. An on-vehicle radar device according to claim 1,
   wherein the control means sets the range gate width to be smaller than a reference range gate width when the subject vehicle velocity is equal to or smaller than a velocity threshold value,
   wherein the control means sets the range gate width to be larger than the reference range gate width when the subject vehicle velocity is larger than the velocity threshold value, and
   wherein the control means sets the transit pulse width to be larger than the reference range gate width and smaller than twice the reference range gate width in both of cases in which the subject vehicle velocity is equal to or smaller than, and larger than the velocity threshold value.

3. An on-vehicle radar device, comprising:
   frequency modulating means for modulating a frequency of a transmission signal by a triangular wave;
   transmitting means for pulsing the frequency modulated transmission signal to transmit the pulsed transmission signal as a transmission pulse to a target;
   receiving means for receiving a signal reflected by the target as a received pulse to generate a beat signal based on a frequency difference between a part of the frequency modulated transmission signal and the received pulse;
   range gate setting means for setting a range gate that determines a sampling timing of the received pulse based on a transmitting timing of the transmission pulse;
   sampling means for sampling the beat signal in each of set range gates;
   distance and relative velocity calculating means for calculating a distance to the target and a relative velocity of the target based on the sampled beat signal; and
   control means for controlling the frequency modulating means, the transmitting means, and the range gate setting means to change a transmission pulse width and a range gate width depending on a distance to a leading vehicle, which is acquired from the distance and relative velocity calculating means at a timing of the frequency modulation.

4. An on-vehicle radar device according to claim 3,
   wherein the control means sets the range gate width to be smaller than a reference range gate width when the distance to the leading vehicle is equal to or smaller than a distance threshold value,
   wherein the control means sets the range gate width to be larger than the reference range gate width when the distance to the leading vehicle is larger than the distance threshold value, and
   wherein the control means sets the transit pulse width to be larger than the reference range gate width and smaller than twice the reference range gate width in both of cases in which the distance to the leading vehicle is equal to or smaller than, and larger than the distance threshold value.

5. An on-vehicle radar device, comprising:
   frequency modulating means for modulating a frequency of a transmission signal by a triangular wave;
   transmitting means for pulsing the frequency modulated transmission signal to transmit the pulsed transmission signal as a transmission pulse to a target;
   receiving means for receiving a signal reflected by the target as a received pulse to generate a beat signal based on a frequency difference between a part of the frequency modulated transmission signal and the received pulse;
   range gate setting means for setting a range gate that determines a sampling timing of the received pulse based on a transmitting timing of the transmission pulse;
   sampling means for sampling the beat signal in each of set range gates;
   distance and relative velocity calculating means for calculating a distance to the target and a relative velocity of the target based on the sampled beat signal;
   open road determining means for determining whether or not a subject vehicle is traveling on an open road; and
   control means for controlling the frequency modulating means, the transmitting means, and the range gate setting means to change a transmission pulse width and a range gate width depending on a result of the determining of the open road determining means at a timing of the frequency modulation.

6. An on-vehicle radar device according to claim 5,
wherein the control means sets the range gate width to be smaller than a reference range gate width when the open road determining means determines that the subject vehicle is traveling on the open road,
wherein the control means sets the range gate width to be larger than the reference range gate width when the open road determining means determines that the subject vehicle is traveling on a highway, and
wherein the control means sets the transit pulse width to be larger than the reference range gate width and smaller than twice the reference range gate width in both of cases where the open road determining means determines that the subject vehicle is traveling on the open road and on the highway.

7. An on-vehicle radar device according to claim 6, wherein the open road determining means determines whether the subject vehicle is traveling on the open road or the highway based on any one or a combination of a plurality of a subject vehicle velocity, a distance to a leading vehicle, a number of detected targets, information from a navigation system, and information from an ETC.

8. An on-vehicle radar device according to claim 7,
wherein the open road determining means determines that the subject vehicle is traveling on the open road when a distance to a leading vehicle, which is acquired from the distance and relative velocity calculating means, is equal to or smaller than a distance threshold value, and determines that the subject vehicle is traveling on the open road when the distance to the leading vehicle is larger than the distance threshold value, and the subject vehicle velocity acquired from vehicle velocity detecting means is equal to or smaller than a velocity threshold value, and
wherein the open road determining means determines that the subject vehicle is traveling on the highway when the distance to the leading vehicle is larger than the distance threshold value, and the subject vehicle velocity is larger than the velocity threshold value.

9. An on-vehicle radar device according to claim 7,
wherein the open road determining means determines that the subject vehicle is traveling on the open road when a number of targets, which is acquired from the distance and relative velocity calculating means, is equal to or larger than a target threshold value, and
wherein the open road determining means determines that the subject vehicle is traveling on the highway when the number of targets is lower than the target threshold value.

10. An on-vehicle radar device according to claim 7,
wherein the open road determining means determines that the subject vehicle is traveling on the open road when determining that an on-vehicle ETC goes out of the highway, and
wherein the open road determining means determines that the subject vehicle is traveling on the highway when determining that the on-vehicle ETC enters the highway.

11. An on-vehicle radar device, comprising:
frequency modulating means for modulating a frequency of a transmission signal by a triangular wave;
transmitting means for pulsing the frequency modulated transmission signal to transmit the pulsed transmission signal as a transmission pulse to a target;
receiving means for receiving a signal reflected by the target as a received pulse to generate a beat signal based on a frequency difference between a part of the frequency modulated transmission signal and the received pulse;
range gate setting means for setting a range gate that determines a sampling timing of the received pulse based on a transmitting timing of the transmission pulse;
sampling means for sampling the beat signal in each of set range gates;
distance and relative velocity calculating means for calculating a distance to the target and a relative velocity of the target based on the sampled beat signal; and
control means for controlling the frequency modulating means, the transmitting means, and the range gate setting means to change a range gate width for each range gate at a timing of the frequency modulation.

12. An on-vehicle radar device according to claim 11,
wherein the control means sets the range gate width to be smaller than a reference range gate width before a given period of time elapses after the transmission pulse is transmitted,
wherein the control means sets the range gate width to be larger than the reference range gate width after the given period of time elapses, and
wherein the control means sets a transmission pulse width to be larger than the range gate width after the given period of time elapses in both cases of before and after the given period of time elapses.

13. An on-vehicle radar device according to claim 11, wherein the control means changes a number of short-distance range gates and a number of long-distance range gates depending on a subject vehicle velocity acquired from vehicle velocity detecting means.

14. An on-vehicle radar device according to claim 13,
wherein the control means sets the number of short-distance range gates to be larger than a reference short-distance range gate number, and sets the number of long-distance range gates to be smaller than a reference long-distance range gate number when the subject vehicle velocity is equal to or smaller than a velocity threshold value, and
wherein the control means sets the number of short-distance range gates to be smaller than the reference short-distance range gate number, and sets the number of long-distance range gates to be larger than the reference long-distance range gate number when the subject vehicle velocity is larger than the velocity threshold value.

15. An on-vehicle radar device according to claim 14,
wherein the control means sets the range gate width of the short-distance range gates to be smaller than the range gate width of the long-distance range gates, and
wherein the control means sets a transmission pulse width to be equal to or larger than the range gate width of the long-distance range gate.

16. An on-vehicle radar device according to claim 11, wherein the control means changes a number of short-distance range gates and a number of long-distance range gates depending on a distance to a leading vehicle, which is acquired from the distance and relative velocity calculating means.

17. An on-vehicle radar device according to claim 13,
wherein the control means sets the number of short-distance range gates to be larger than a reference short-distance range gate number, and sets the number of long-distance range gates to be smaller than a reference long-distance range gate number when the distance to the leading vehicle is equal to or smaller than a distance threshold value, and wherein the control means sets the number of short-distance range gates to be smaller than the reference short-distance range gate number, and sets the number of long-distance range gates to be larger than the reference long-distance range gate number when the distance to the leading vehicle is larger than the distance threshold value.

18. An on-vehicle radar device according to claim 17, wherein the control means sets the range gate width of the short-distance range gates to be smaller than the range gate width of the long-distance range gates, and wherein the control means sets a transmission pulse width to be equal to or larger than the range gate width of the long-distance range gate.

19. An on-vehicle radar device according to claim 11, wherein the control means sets three or more kinds of range gate widths, and wherein the control means sets a transmission pulse width to be larger than a largest range gate width.

20. An on-vehicle radar device, comprising:

frequency modulating means for modulating a frequency of a transmission signal by a triangular wave;

transmitting means for pulsing the frequency modulated transmission signal to transmit the pulsed transmission signal as a transmission pulse to a target;

receiving means for receiving a signal reflected by the target as a received pulse to generate a beat signal based on a frequency difference between a part of the frequency modulated transmission signal and the received pulse;

range gate setting means for setting a range gate that determines a sampling timing of the received pulse based on a transmitting timing of the transmission pulse;

sampling means for sampling the beat signal in each of set range gates;

distance and relative velocity calculating means for calculating a distance to the target and a relative velocity of the target based on the sampled beat signal; and control means for controlling the frequency modulating means, the transmitting means, and the range gate setting means to change a range gate width depending on a travel environment and to change a frequency modulation width and modulation time at a timing of the frequency modulation.

21. An on-vehicle radar device according to claim 20, wherein the control means sets the frequency modulation width to be larger than a reference frequency modulation width, and sets the modulation time to be longer than reference modulation time when the control means sets the range gate width to be smaller than a reference range gate width, and wherein the control means sets the frequency modulation width to be smaller than the reference frequency modulation width, and sets the modulation time to be shorter than the reference modulation time when the control means sets the range gate width to be larger than the reference range gate width.

22. An on-vehicle radar device, comprising:

frequency modulating means for modulating a frequency of a transmission signal by a triangular wave;

transmitting means for pulsing the frequency modulated transmission signal to transmit the pulsed transmission signal as a transmission pulse to a target;

receiving means for receiving a signal reflected by the target as a received pulse to generate a beat signal based on a frequency difference between a part of the frequency modulated transmission signal and the received pulse;

range gate setting means for setting a range gate that determines a sampling timing of the received pulse based on a transmitting timing of the transmission pulse;

sampling means for sampling the beat signal in each of set range gates;

distance and relative velocity calculating means for calculating a distance to the target and a relative velocity of the target based on the sampled beat signal; and control means for controlling the frequency modulating means, the transmitting means, and the range gate setting means to change a range gate width in each of range gates at a timing of the frequency modulation, wherein the distance and relative velocity calculating means includes measurement time changing means for changing measurement time which is time required for sampling from a start to an end of measurement data.

23. An on-vehicle radar device according to claim 22, wherein the measurement time changing means sets the measurement time to be long when the range gate width is smaller than a reference range gate width, and wherein the measurement time changing means sets the measurement time to be short when the range gate width is larger than the reference range gate width.

* * * * *